United States Patent
Klein et al.

(10) Patent No.: US 12,276,354 B2
(45) Date of Patent: Apr. 15, 2025

(54) FOOD ARTICLE DEFECT REMOVAL APPARATUS

(71) Applicant: Lamb Weston, Inc., Eagle, ID (US)

(72) Inventors: Phillip Klein, Eagle, ID (US); Kevin Mellor, Eagle, ID (US); Chris Rhynalds, Eagle, ID (US)

(73) Assignee: Lamb Weston, Inc., Eagle, ID (US)

( * ) Notice: Subject to any disclaimer, the term of this patent is extended or adjusted under 35 U.S.C. 154(b) by 579 days.

(21) Appl. No.: 17/000,510

(22) Filed: Aug. 24, 2020

(65) Prior Publication Data

US 2021/0080025 A1 Mar. 18, 2021

Related U.S. Application Data

(63) Continuation of application No. 15/132,352, filed on Apr. 19, 2016, now Pat. No. 10,753,507.

(51) Int. Cl.
*B07C 5/36* (2006.01)
*F16K 31/06* (2006.01)
*F16K 37/00* (2006.01)

(52) U.S. Cl.
CPC .......... *F16K 37/0025* (2013.01); *B07C 5/368* (2013.01); *F16K 31/0675* (2013.01);
(Continued)

(58) Field of Classification Search
None
See application file for complete search history.

(56) References Cited

U.S. PATENT DOCUMENTS

| 3,782,544 A | 1/1974 | Perkins |
| 4,576,071 A ‡ | 3/1986 | Rayment ............... A21C 15/00 83/104 |

(Continued)

FOREIGN PATENT DOCUMENTS

| CN | 201603651 U | 10/2010 |
| CN | 102192359 A | 9/2011 |

(Continued)

OTHER PUBLICATIONS

Notification of Transmittal of the International Search Report and The Written Opinion of the International Searching Authority—Jul. 19, 2017.‡

(Continued)

*Primary Examiner* — Angelisa L. Hicks
(74) *Attorney, Agent, or Firm* — TraskBritt

(57) ABSTRACT

A food article defect removal apparatus includes a manifold that defines one or more chambers for holding pressurized fluid. First channels extend from a first side of the manifold into fluid communication with the chambers. Second channels extend from the first side of the manifold to a second side of the manifold. Valves selectively connect corresponding first channels and second channels together to dispense the pressurized fluid from the manifold. The manifold can have an exterior wall that at least partially defines a first chamber and a second chamber, with an interior wall disposed between the first chamber and the second chamber. The interior wall can define the second channels. The valves can be included with a valve assembly, which includes a driver operably coupled with the valves. The valves can be pluggably coupled with the driver.

20 Claims, 19 Drawing Sheets

(52) U.S. Cl.
CPC .. *F16K 37/0058* (2013.01); *B07C 2501/0018* (2013.01); *B07C 2501/0081* (2013.01); *B07C 2501/009* (2013.01)

(56) References Cited

U.S. PATENT DOCUMENTS

| | | | |
|---|---|---|---|
| 4,818,922 A * | 4/1989 | Sears | H02P 6/20 |
| | | | 318/400.42 |
| 5,040,353 A | 8/1991 | Evans et al. | |
| 5,127,440 A | 7/1992 | Maas et al. | |
| 5,209,355 A | 5/1993 | Mindermann | |
| 5,333,647 A | 8/1994 | Fukano et al. | |
| 5,339,965 A | 8/1994 | Klukis et al. | |
| 5,495,871 A ‡ | 3/1996 | Meloche | F15B 13/0817 |
| | | | 137/56 |
| 5,502,380 A ‡ | 3/1996 | Sittler | F16K 37/0033 |
| | | | 137/554 |
| 5,779,058 A | 7/1998 | Satake et al. | |
| 6,155,287 A | 12/2000 | Matarai et al. | |
| 6,189,565 B1 ‡ | 2/2001 | Skog | F16K 37/0058 |
| | | | 137/552 |
| 6,213,153 B1 | 4/2001 | Hayashi et al. | |
| 6,397,797 B1 * | 6/2002 | Kolmanovsky | F01L 9/20 |
| | | | 123/90.11 |
| 6,520,202 B2 | 2/2003 | Miyazoe et al. | |
| 6,832,788 B2 | 12/2004 | Fukano et al. | |
| 6,874,537 B2 | 4/2005 | Hayashi et al. | |
| 6,889,121 B1 * | 5/2005 | Shahroudi | H01F 7/1844 |
| | | | 700/282 |
| 7,014,126 B2 | 3/2006 | Boertje et al. | |
| 7,328,720 B2 | 2/2008 | Miyazoe | |
| 7,438,088 B2 | 10/2008 | Matsumoto et al. | |
| 7,765,971 B1 ‡ | 8/2010 | Overacker | F01M 9/10 |
| | | | 123/90 |
| 7,997,413 B2 * | 8/2011 | Schmitz | D01G 23/08 |
| | | | 239/562 |
| 8,413,679 B2 | 4/2013 | Wenske et al. | |
| 8,919,565 B2 * | 12/2014 | Yamaguchi | B07C 5/3425 |
| | | | 209/932 |
| 8,931,507 B2 | 1/2015 | Murakami et al. | |
| 9,211,907 B2 * | 12/2015 | Kubo | B62D 5/065 |
| 9,586,236 B2 | 3/2017 | Starzmann | |
| 9,625,049 B2 | 4/2017 | Starzmann | |
| 9,689,503 B2 | 6/2017 | Inaba | |
| 2004/0181302 A1 ‡ | 9/2004 | Schrader | B07C 5/368 |
| | | | 700/11 |
| 2006/0226056 A1 | 10/2006 | Oestreich et al. | |
| 2008/0264498 A1 * | 10/2008 | Thompson | F16K 37/0058 |
| | | | 700/282 |
| 2009/0205724 A1 | 8/2009 | Brenner et al. | |
| 2009/0242040 A1 | 10/2009 | Kees | |
| 2013/0153035 A1 * | 6/2013 | Young | F23N 1/005 |
| | | | 137/551 |
| 2013/0266325 A1 ‡ | 10/2013 | Giustiniano | H04B 10/116 |
| | | | 398/130 |
| 2015/0129055 A1 * | 5/2015 | Byler | F16K 37/0083 |
| | | | 137/487.5 |
| 2015/0211739 A1 | 7/2015 | Loveless et al. | |
| 2015/0224845 A1 ‡ | 8/2015 | Anderson | B60G 17/019 |
| | | | 701/37 |
| 2015/0253746 A1 | 9/2015 | Mills | |
| 2015/0266062 A1 * | 9/2015 | Starzmann | B07C 5/36 |
| | | | 209/644 |
| 2016/0016200 A1 | 1/2016 | Gaiardo et al. | |

FOREIGN PATENT DOCUMENTS

| | | |
|---|---|---|
| CN | 102216661 A | 10/2011 |
| CN | 103363185 A | 10/2013 |
| EP | 0648940 A1 | 4/1995 |
| EP | 2923777 A1 | 9/2015 |
| WO | WO-1983002811 ‡ | 8/1983 |
| WO | 9310913 A1 | 6/1993 |
| WO | WO-9709689 ‡ | 3/1997 |

OTHER PUBLICATIONS

Supplemental European Search Report dated Oct. 15, 2019 for EP17786432.
Office Action for Chinese Application No. 202110226187.7, dated Jun. 29, 2022.
European Communication pursuant to Article 94(3) EPC for European Application No. 17786432.9, dated Aug. 18, 2022, 7 pages.
European Communication pursuant to Article 94(3) EPC for European Application No. 17786432.9, dated Mar. 31, 2021, 3 pages.
European Communication pursuant to Article 94(3) EPC for European Application No. 17786432.9, dated Nov. 15, 2021, 3 pages.
International Search Report for International Application No. PCT/US17/28030, mailed Jul. 19, 2017, 4 pages.
International Written Opinion for International Application No. PCT/US17/28030, mailed Jul. 19, 2017, 33 pages.

\* cited by examiner
‡ imported from a related application

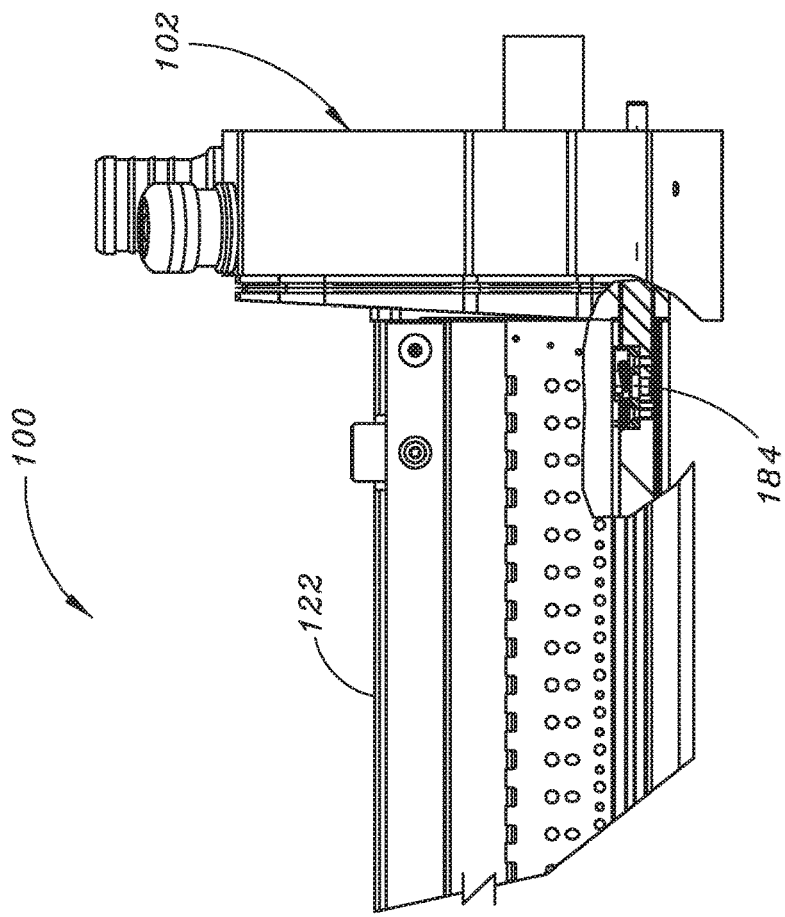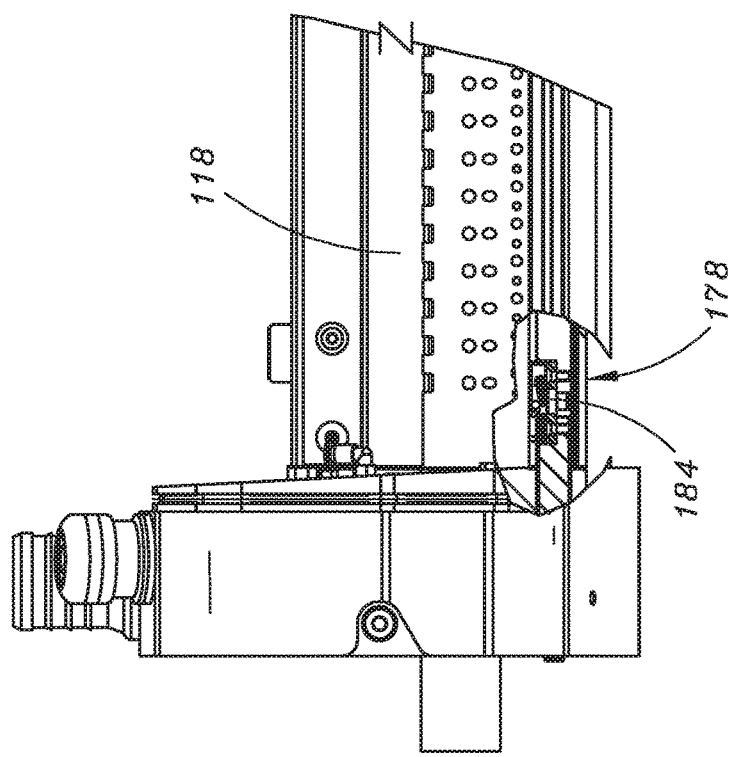
FIG. 16

FOOD ARTICLE DEFECT REMOVAL APPARATUS

CROSS-REFERENCE TO RELATED APPLICATIONS

This application is a continuation of U.S. application Ser. No. 15/132,352, filed Apr. 19, 2016, entitled FOOD ARTICLE DEFECT REMOVAL APPARATUS, now U.S. Pat. No. 10,753,507, issued Aug. 25, 2020. The complete disclosure of the aforementioned application is incorporated herein in its entirety by this reference.

BACKGROUND

Solid objects can be sorted using various automated processes. For example, optical sorters can be used to recognize objects based upon color, size, shape, structural properties, chemical composition, and so forth. In the food industry, optical sorting can be used in the processing of harvested foods, such as potatoes, fruits, vegetables, nuts, and so on.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to a food article defect removal apparatus for removing defective food articles from a food processing line. The defect removal apparatus includes a manifold that defines one or more chambers for holding pressurized fluid. First channels extend from a first side of the manifold into fluid communication with the chambers. Second channels extend from the first side of the manifold to a second side of the manifold. Valves selectively connect corresponding first channels and second channels together to dispense the pressurized fluid from the manifold. The manifold can have an exterior wall that at least partially defines a first chamber and a second chamber, with an interior wall disposed between the first chamber and the second chamber. The interior wall can define the second channels. The valves can be included with a valve assembly, which also includes a driver operably coupled with the valves. The valves can be pluggably coupled with the driver.

DRAWINGS

The Detailed Description is described with reference to the accompanying figures.

FIG. 16 is a partial side elevation view of the removal apparatus illustrated in FIG. 14.

Figure 17:
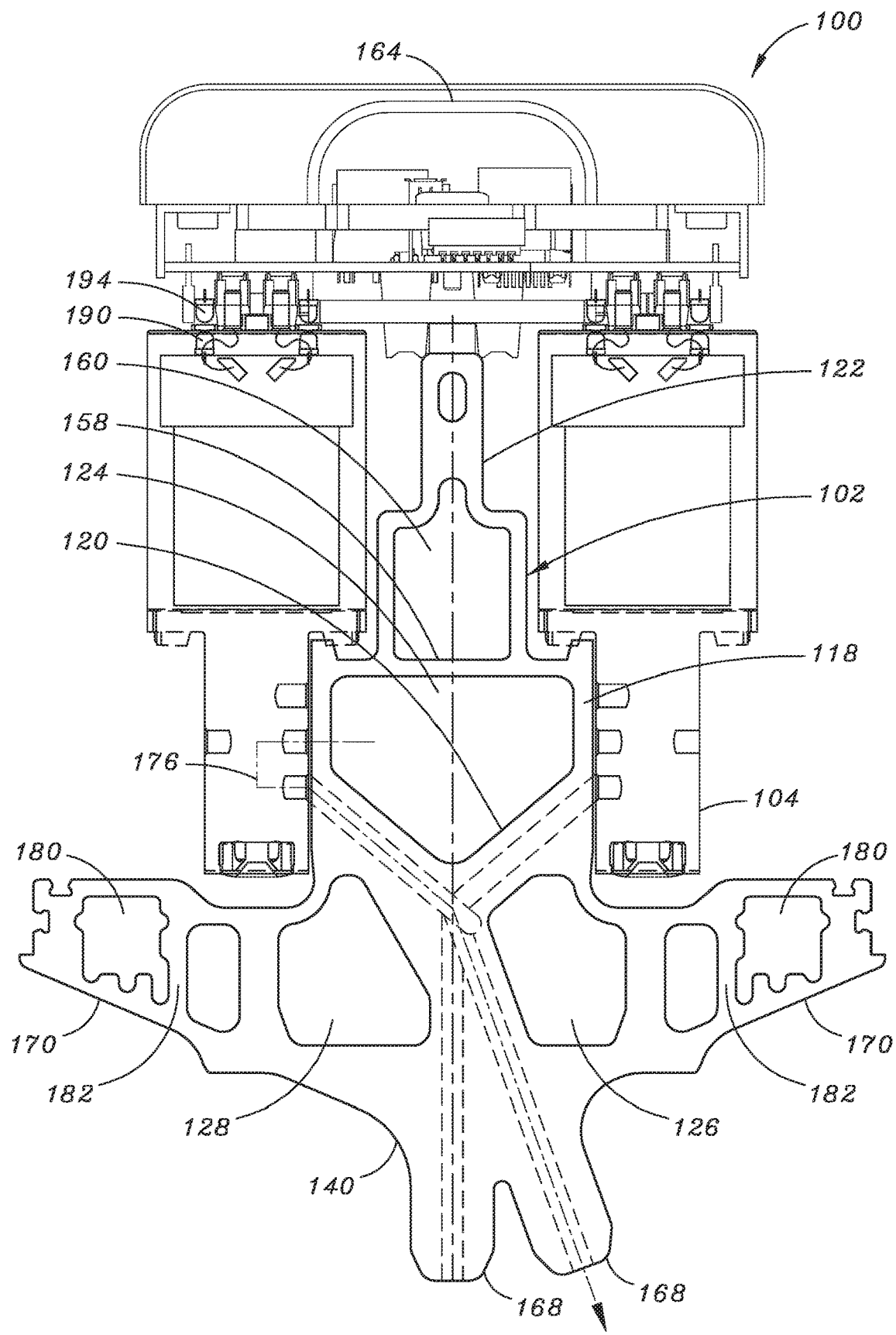
FIG. 17 is a partial cross-sectional side elevation view illustrating a food article foreign material/product/defect removal apparatus in accordance with an example embodiment of the present disclosure.
Figure 18:
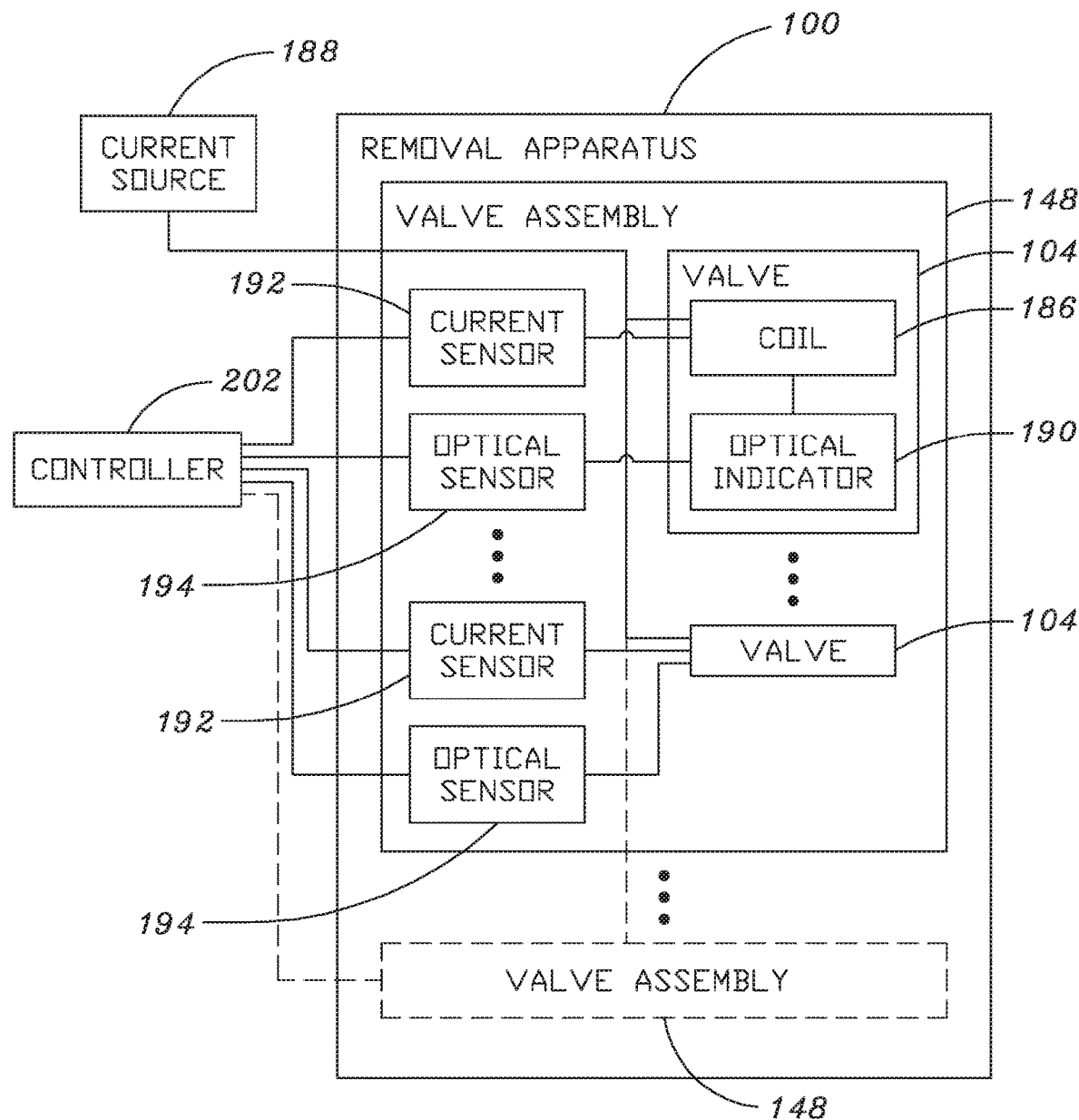

FIG. 18 is a block diagram illustrating a system configured to remove defective food articles from a food processing line, where the system includes a controller and a food article foreign material/product/defect removal apparatus, such as the removal apparatus illustrated in FIG. 17, where the system can include a computer system, an electronic database, an alert mechanism, valve health check and maintenance equipment, and so forth, where valve health characteristic and data collection can be performed in real-time, and where valve characteristic changes can be detected and history for the life of a valve can be tracked in accordance with example embodiments of the present disclosure.

Figure 1:
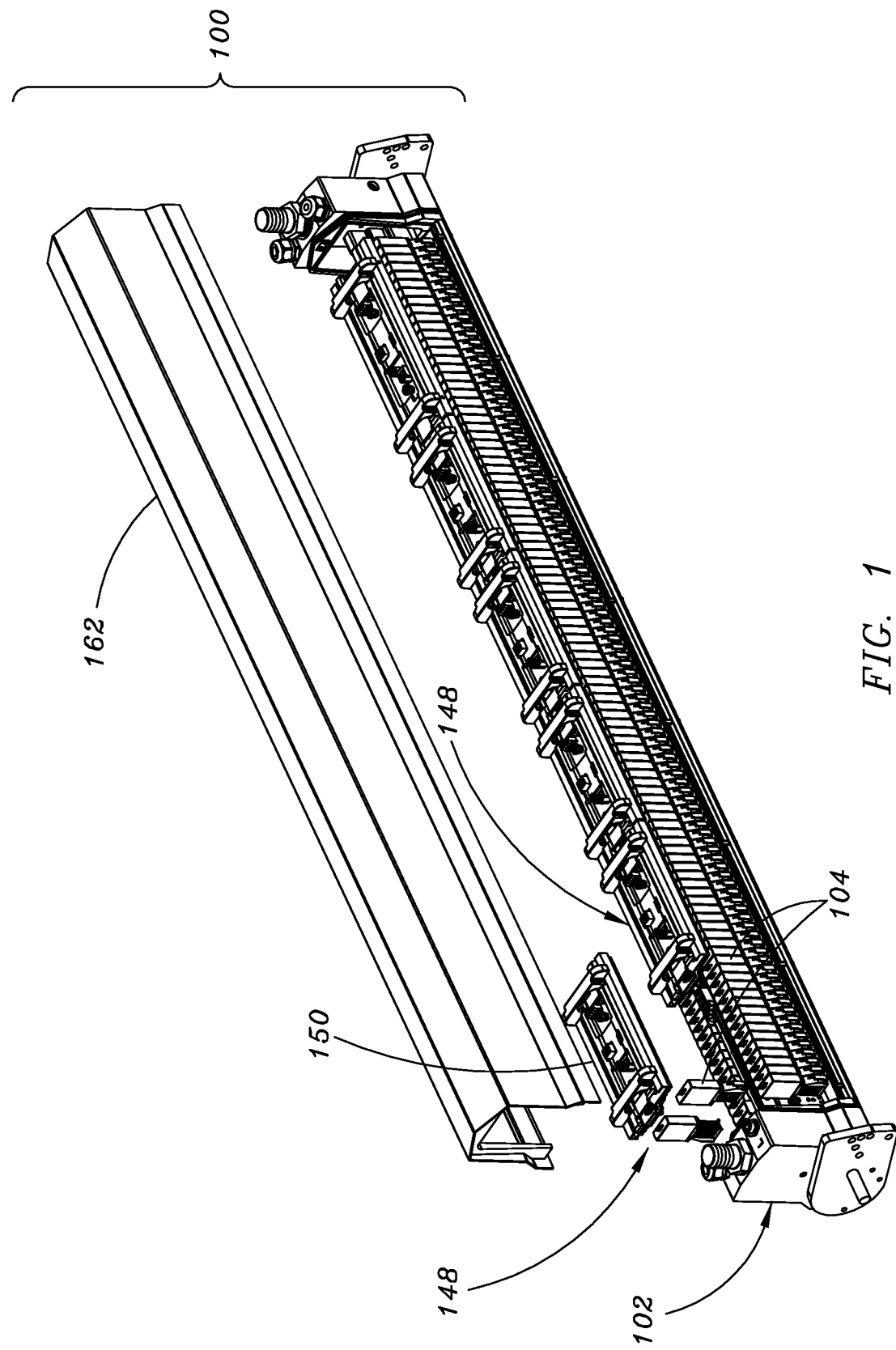
FIG. 1 is an exploded isometric view illustrating a food article foreign material/product/defect removal apparatus in accordance with an example embodiment of the present disclosure.
Figure 2:
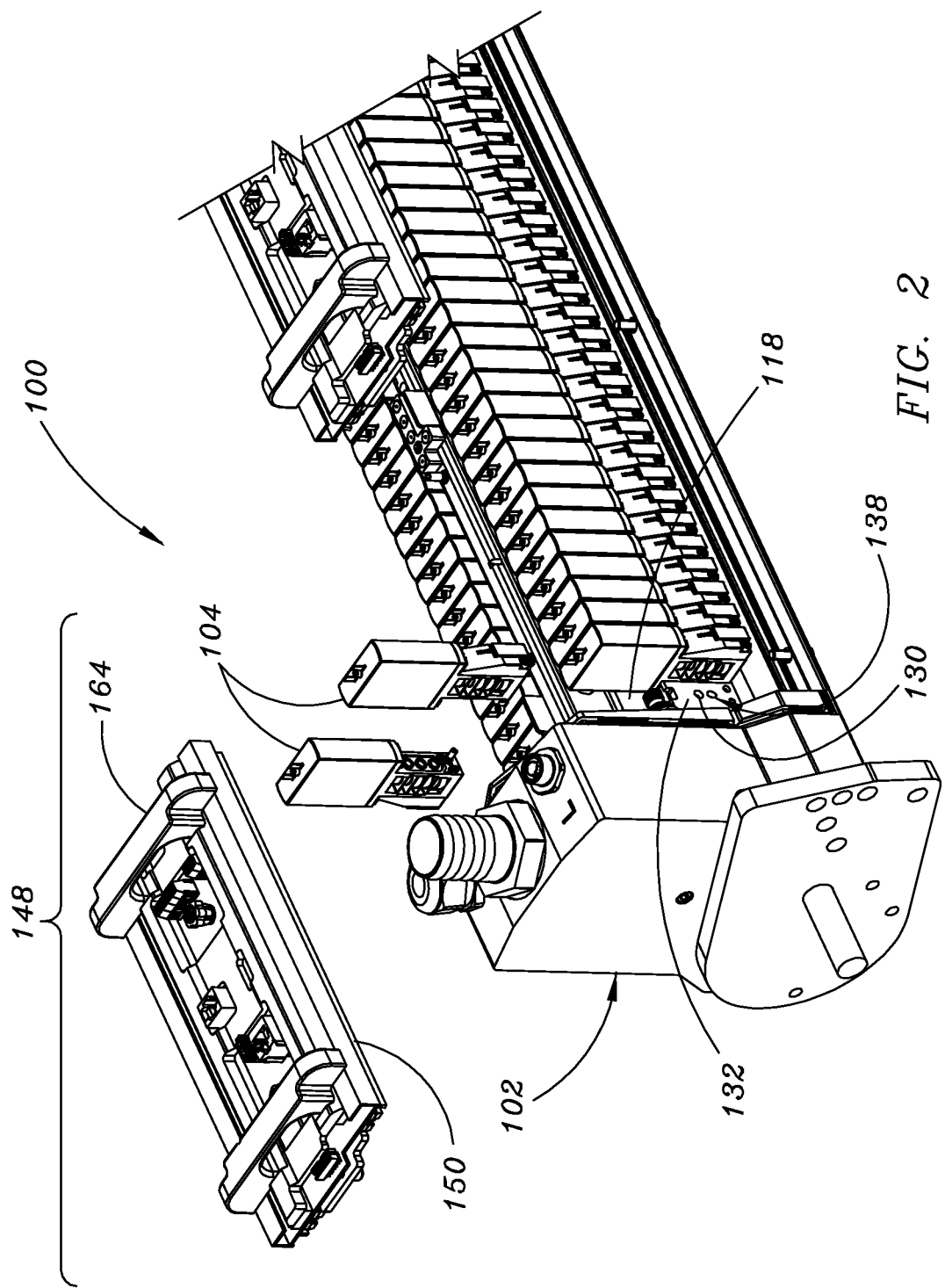
FIG. 2 is a partial exploded isometric view of the removal apparatus illustrated in FIG. 1.
Figure 3:
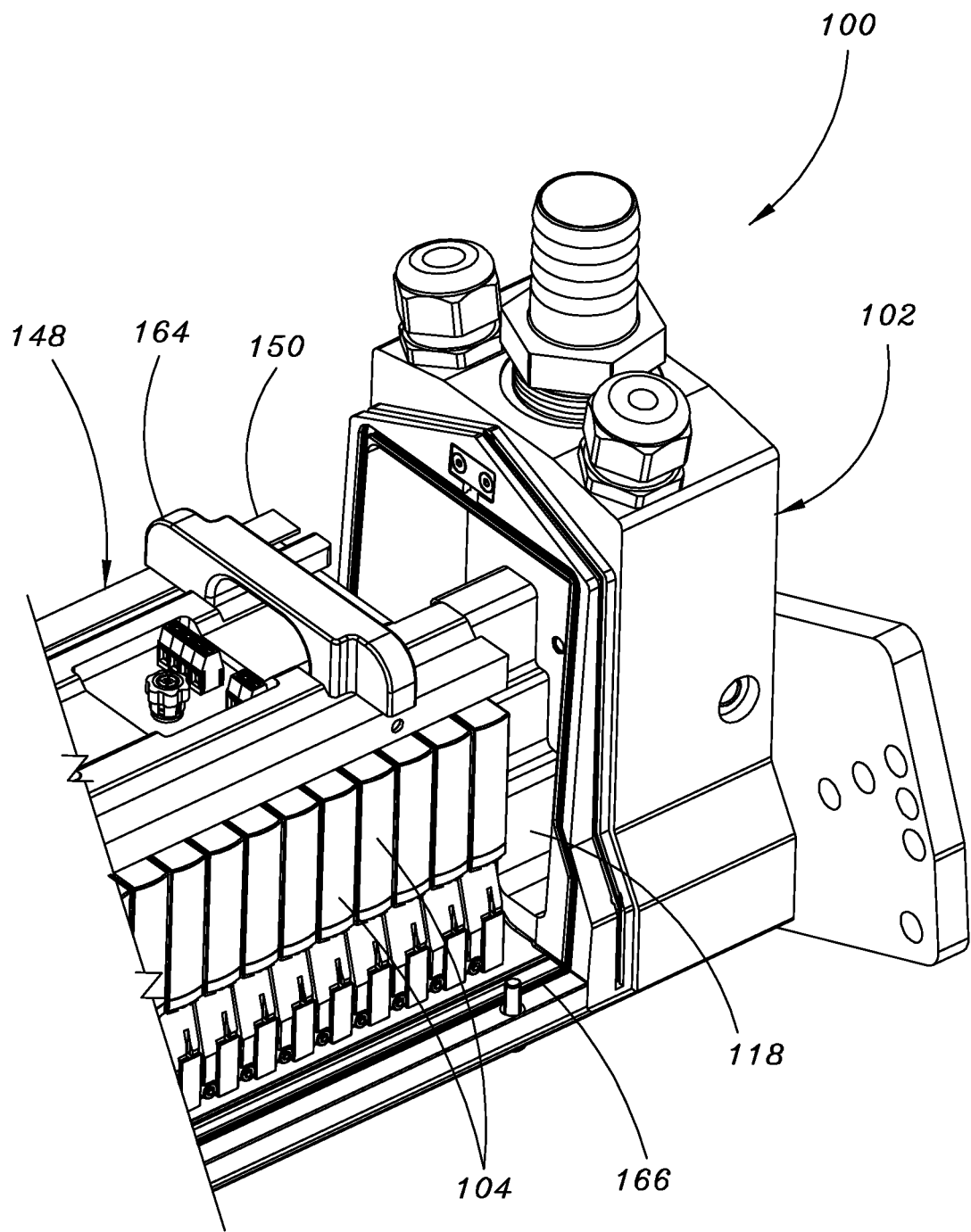
FIG. 3 is another partial exploded isometric view of the removal apparatus illustrated in FIG. 1.
Figure 4:
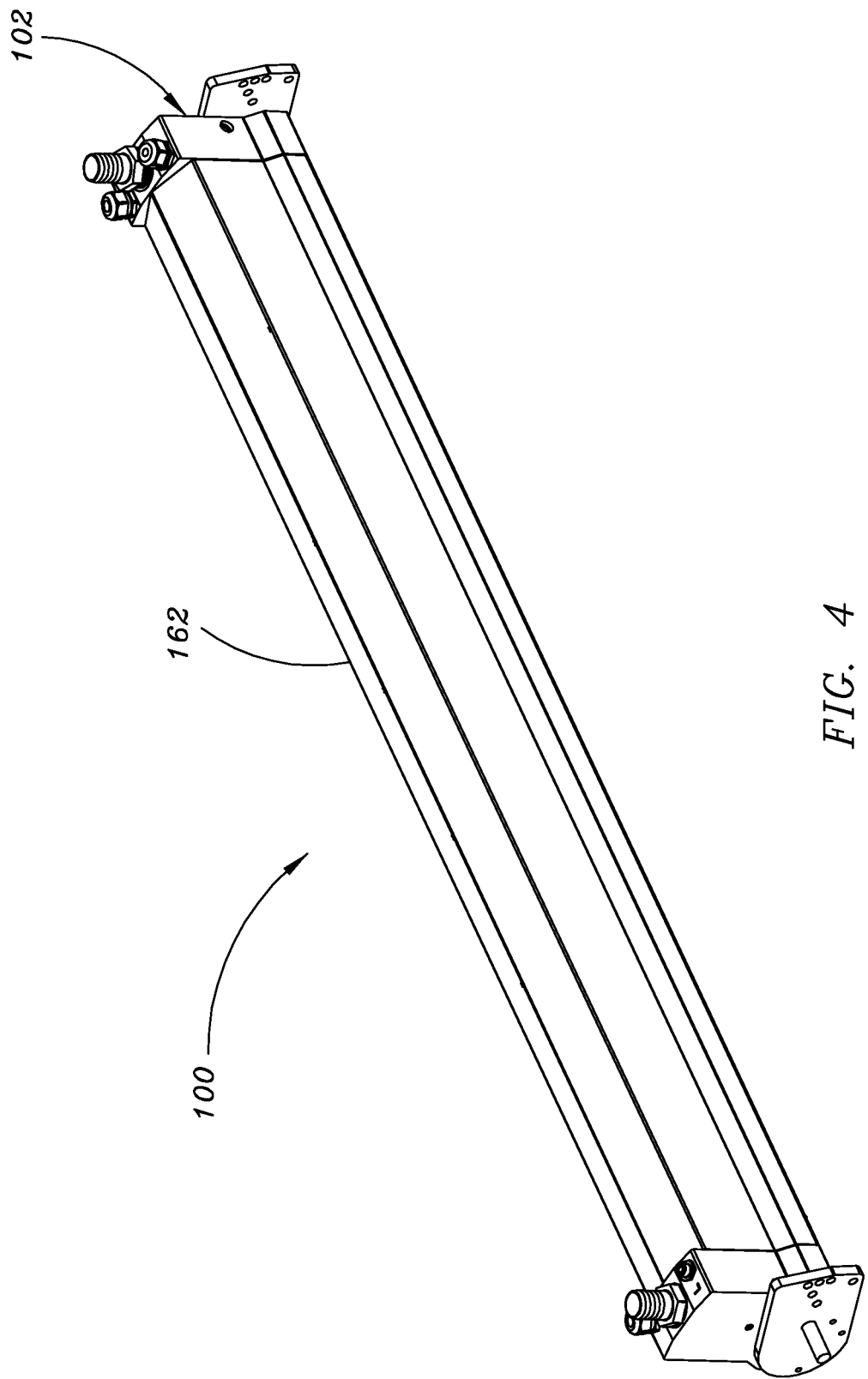
FIG. 4 is an isometric view of the removal apparatus illustrated in FIG. 1.
Figure 19:
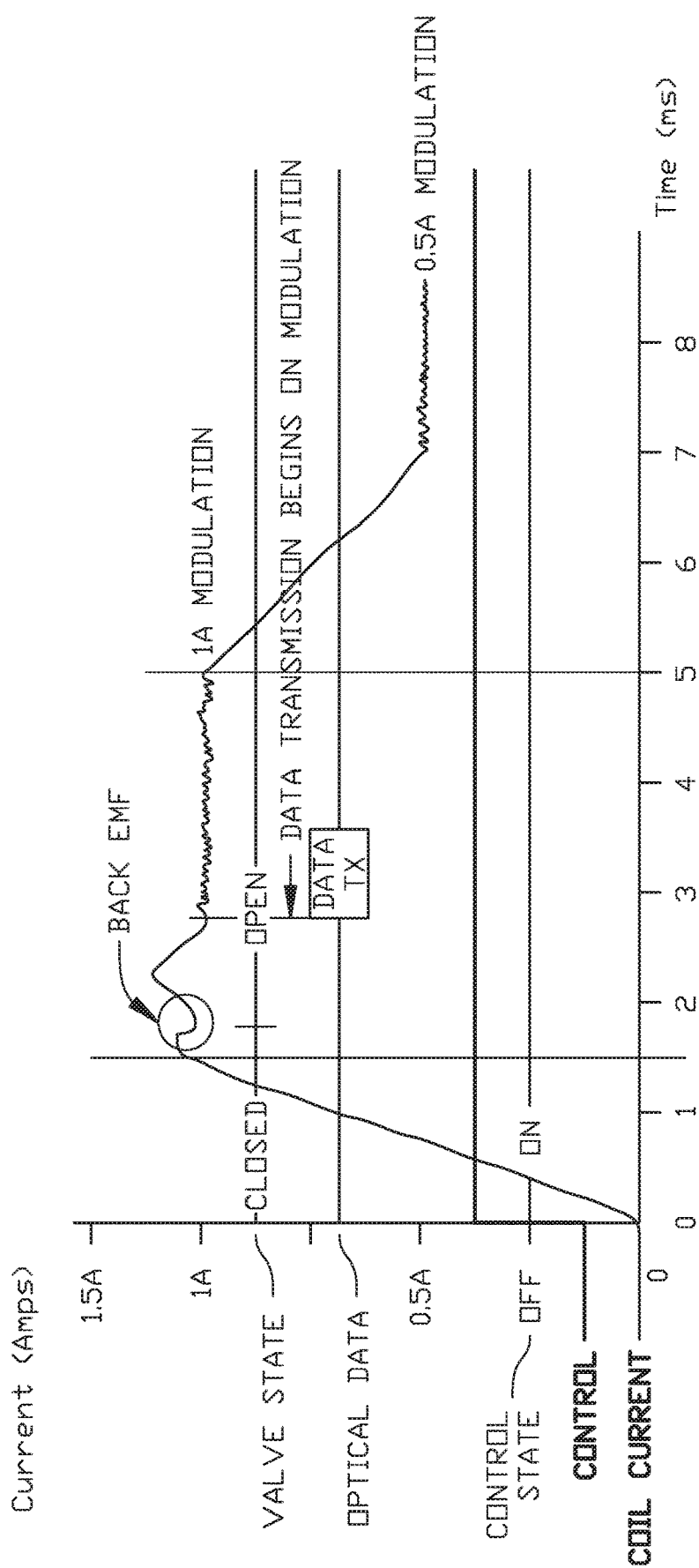

FIG. 19 is a graph illustrating valve current measurements for a valve in a food article foreign material/product/defect removal apparatus, such as the removal apparatus illustrated in FIG. 1, where the valve current measurements are received from a current sensor connected to the valve, and where the current sensor measurements from the current sensor can be differentiated to determine a back electromotive force (back EMF) to determine whether the valve is healthy in accordance with an example embodiment of the present disclosure.

Figure 20:
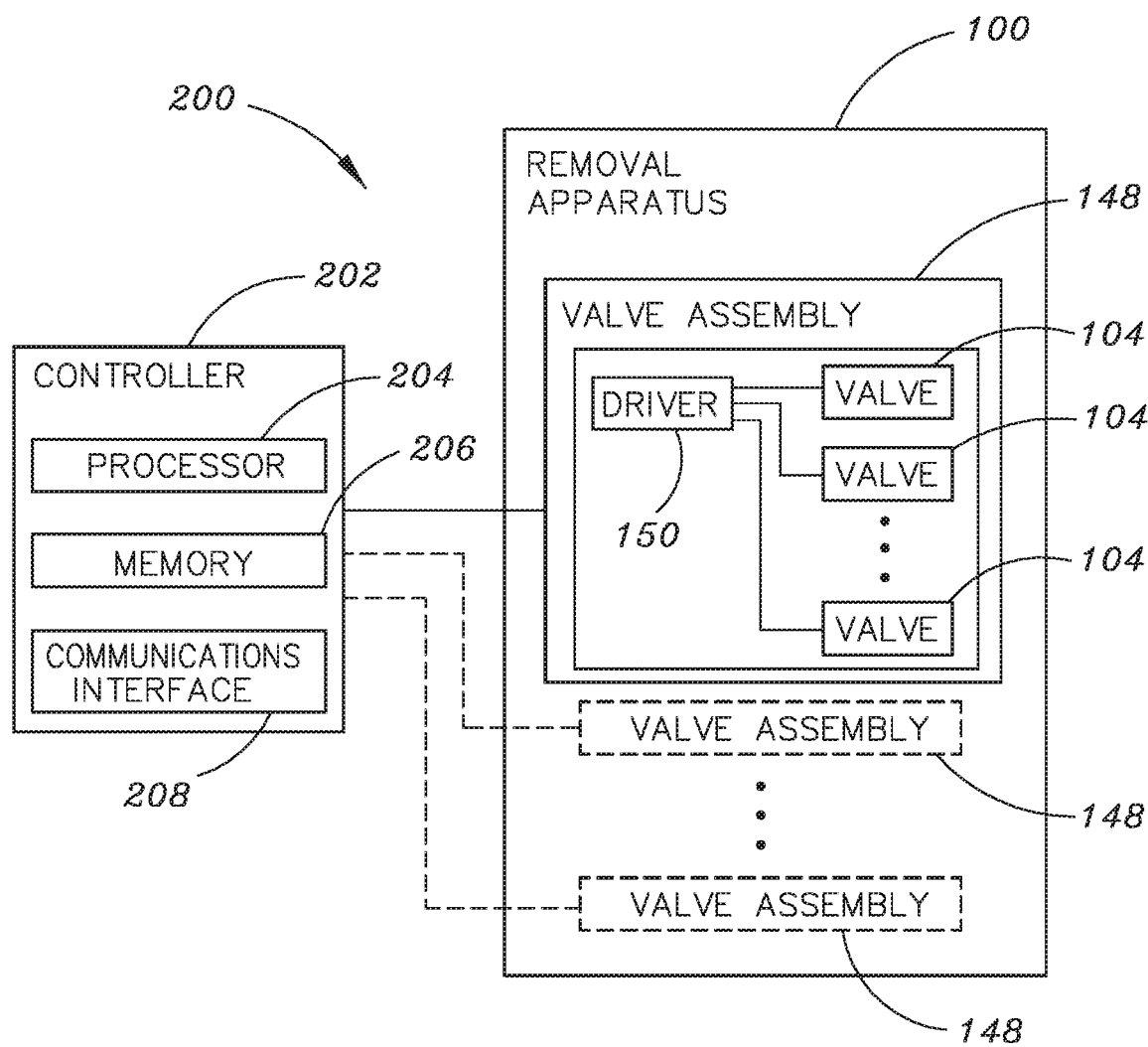

FIG. 20 is a block diagram illustrating a system configured to remove defective food articles from a food processing line, where the system includes a controller and a food article foreign material/product/defect removal apparatus, such as the removal apparatus illustrated in FIG. 1, in accordance with an example embodiment of the present disclosure.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Figure 5:
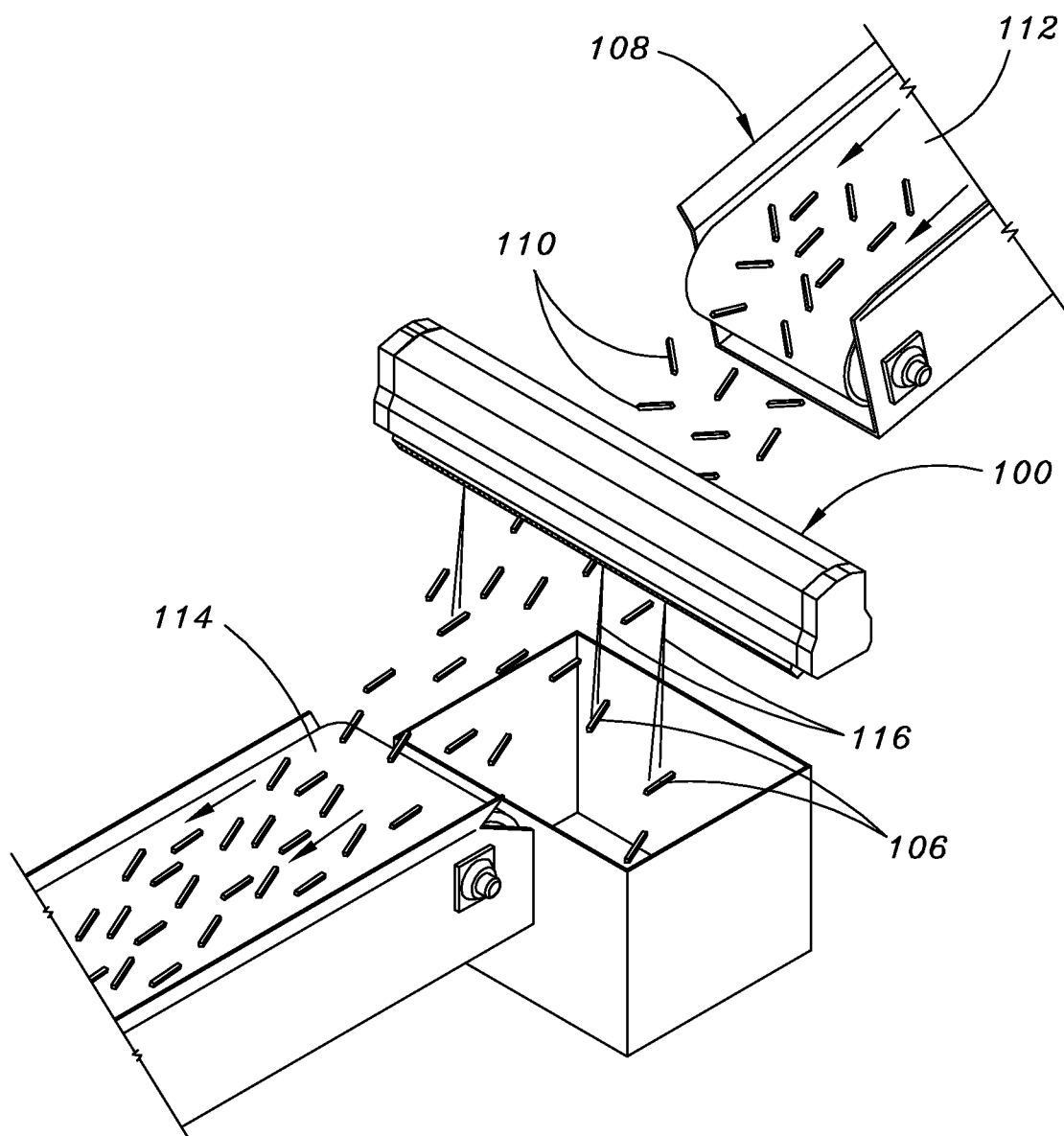
FIG. 5 is an isometric view illustrating a food article foreign material/product/defect removal apparatus, such as the removal apparatus illustrated in FIG. 1, where the removal apparatus is employed to remove defective food articles from a food processing line in accordance with an example embodiment of the present disclosure.
Figure 6:
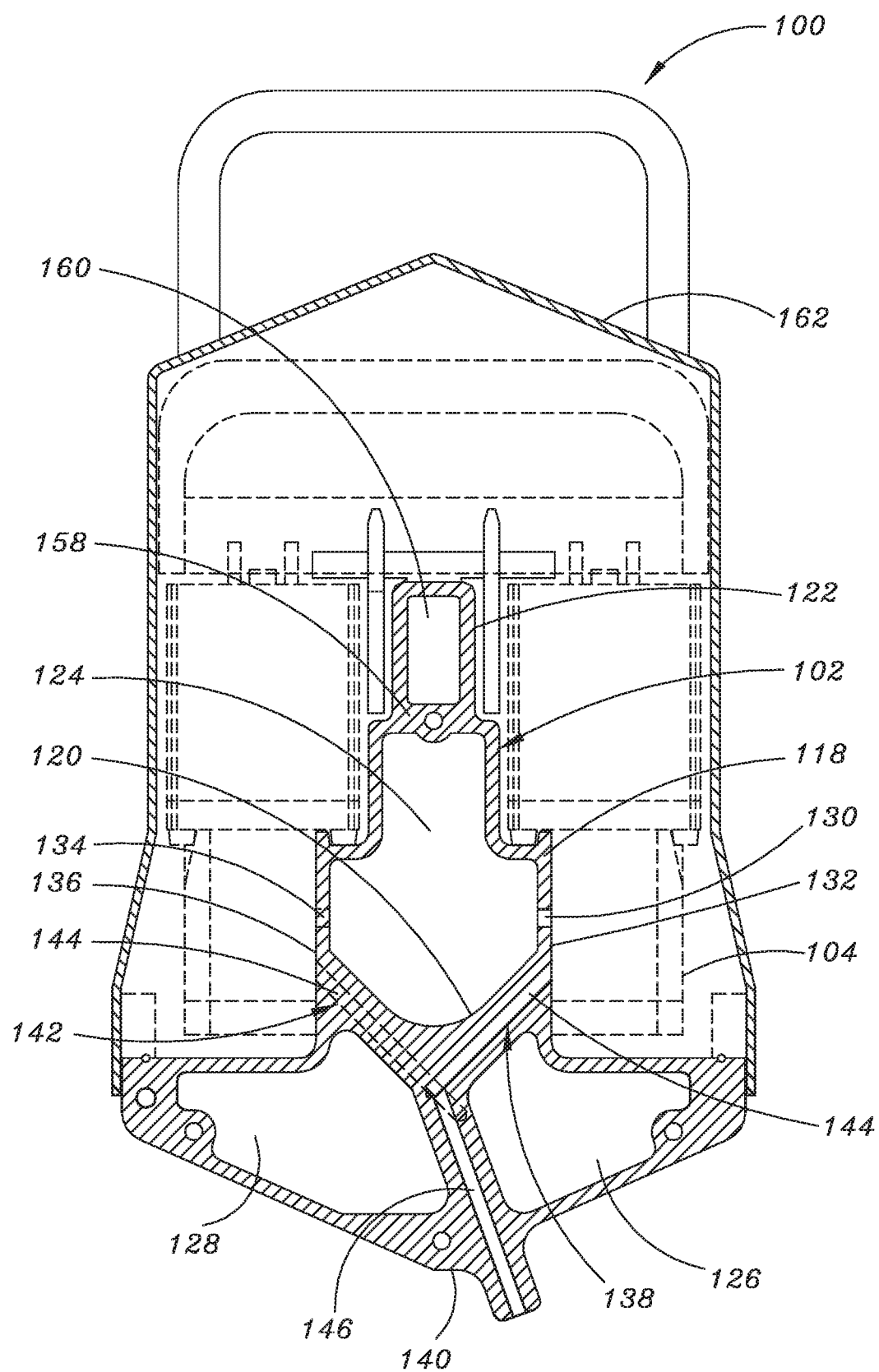
FIG. 6 is a partial cross-sectional side elevation view of the removal apparatus illustrated in FIG. 1.
Figure 7:
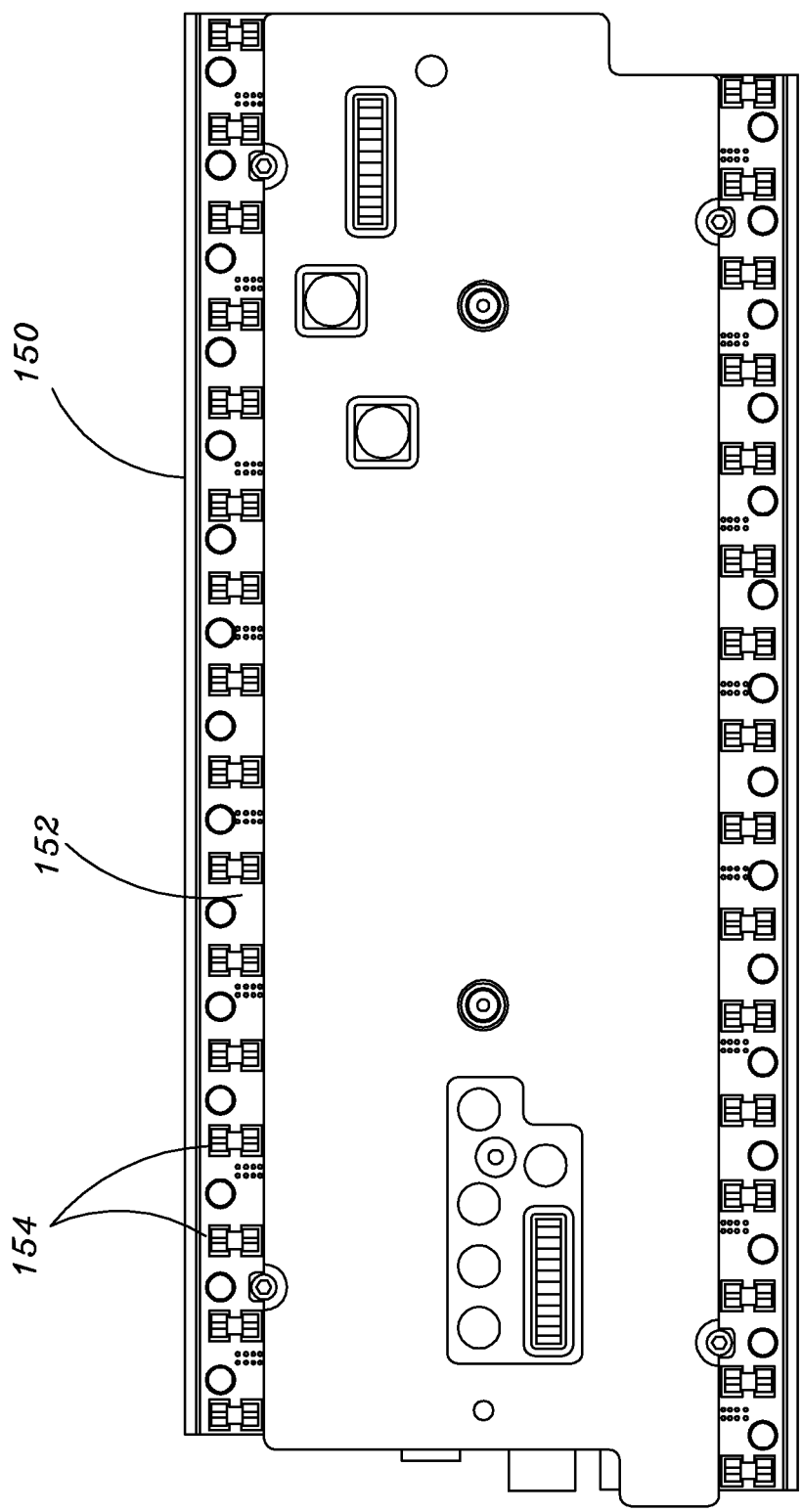
FIG. 7 is a bottom plan view of a driver for a food article foreign material/product/defect removal apparatus, such as the removal apparatus illustrated in FIG. 1, in accordance with an example embodiment of the present disclosure.
Figure 8:
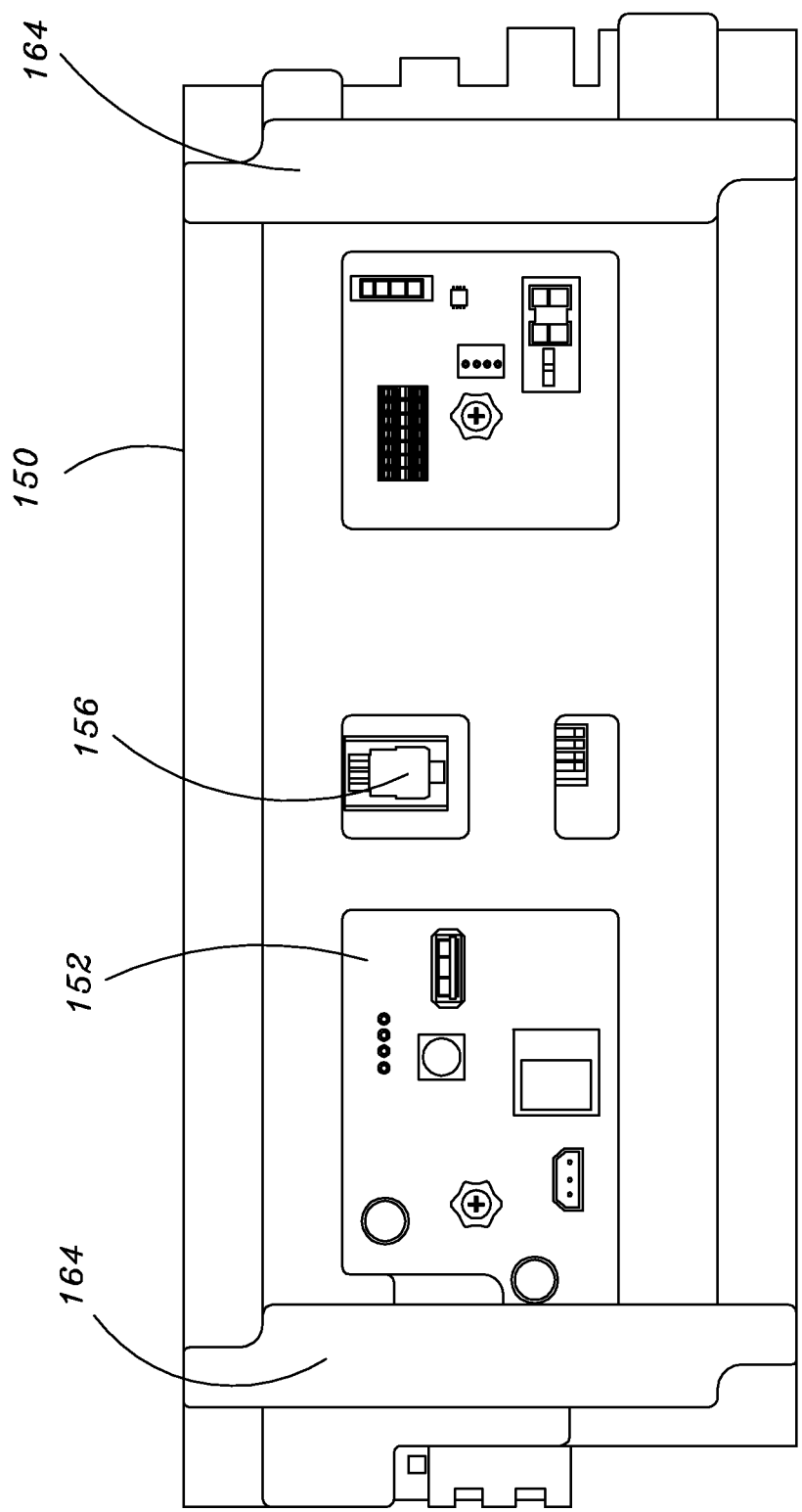
FIG. 8 is a top plan view of the driver illustrated in FIG. 7.

Referring generally to FIGS. 1 through 20, a food article foreign material (FM), product, and/or defect removal apparatus 100 is described in accordance with example embodiments of the present disclosure. The removal apparatus 100 includes a manifold 102 for holding pressurized fluid (e.g., air). The removal apparatus 100 also includes valves 104 that can selectively dispense the pressurized fluid from the manifold 102. In some embodiments, the removal apparatus 100 is employed to remove defective food articles 106 from a food processing line 108 (e.g., as shown in FIG. 5). For example, potatoes are washed, peeled, trimmed, and/or sliced to form individual food articles 110, which can then be further processed (e.g., de-sugared, blanched, frozen, fried, and so forth) to form french fried potatoes. During processing, the food articles 110 can be directed into proximity with the removal apparatus 100, and the removal apparatus 100 can be used to remove defective food articles 106 from the food processing line 108. For instance, the food articles 110 are moved along a first conveyor 112 and onto a second conveyor 114. The removal apparatus 100 can be positioned between the first conveyor 112 and/or one or more drop chutes (not shown) and the second conveyor 114. When a defective food article 106 (e.g., a blemished potato strip) is identified, one or more valves 104 of the removal apparatus 100 can be used to selectively dispense the pressurized fluid from the manifold 102 (e.g., in the form of an air jet 116) to direct the defective food article 106 off of the food processing line 108. The defective food article 106 can be collected, discarded, used for a by-product by a food processor, and so on.

It should be noted that while potato food products are described herein with some specificity, the apparatus and techniques of the present disclosure are not meant to be limited to use with a particular food or type of food. Thus, the removal apparatus 100 can be used with a wide variety of food articles 110, including, but not necessarily limited to, whole foods (e.g., whole potatoes and/or other produce), foods where kernels are removed (e.g., cherries, pitted olives), and so on. Further, the removal apparatus 100 can be used for removing materials other than food (e.g., foreign material and/or foreign objects) from a processing line. It should also be noted that various equipment can be used to identify a defective food article 106 on the food processing line 108. For example, the removal apparatus 100 can be used with optical sorting equipment that identifies the articles to be removed based upon one or more optical characteristics of the food articles 110. It should also be noted that optical sorting technology is provided by way of example only and is not meant to limit the present disclosure. In other embodiments, a defective food article 106 can be identified using other sorting and/or identification techniques, including other physical sorting and/or identification techniques.

Figure 9:
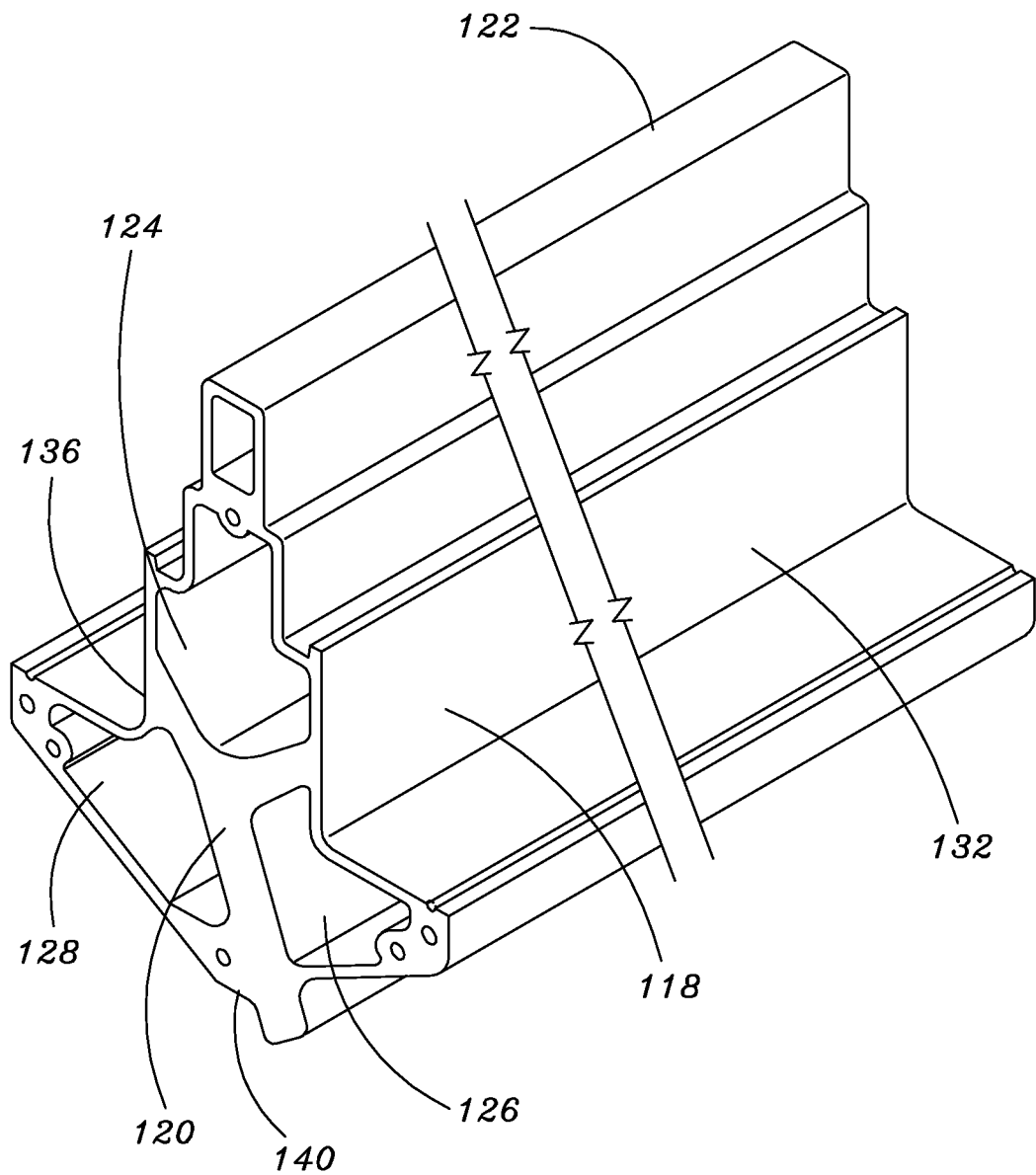
FIG. 9 is a partial isometric view illustrating an extrusion for a food article foreign material/product/defect removal apparatus, such as the removal apparatus illustrated in FIG. 1, in accordance with an example embodiment of the present disclosure.
Figure 10:
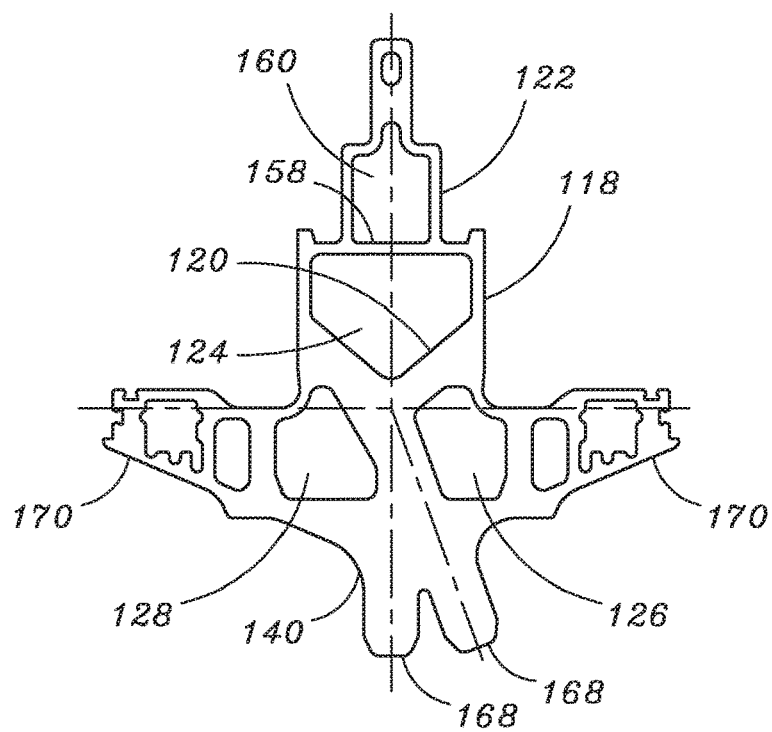
FIG. 10 is an end view illustrating an extrusion for a food article foreign material/product/defect removal apparatus, such as the removal apparatus illustrated in FIG. 1, where the extrusion includes both straight and slanted nozzles in accordance with an example embodiment of the present disclosure.
Figure 11:
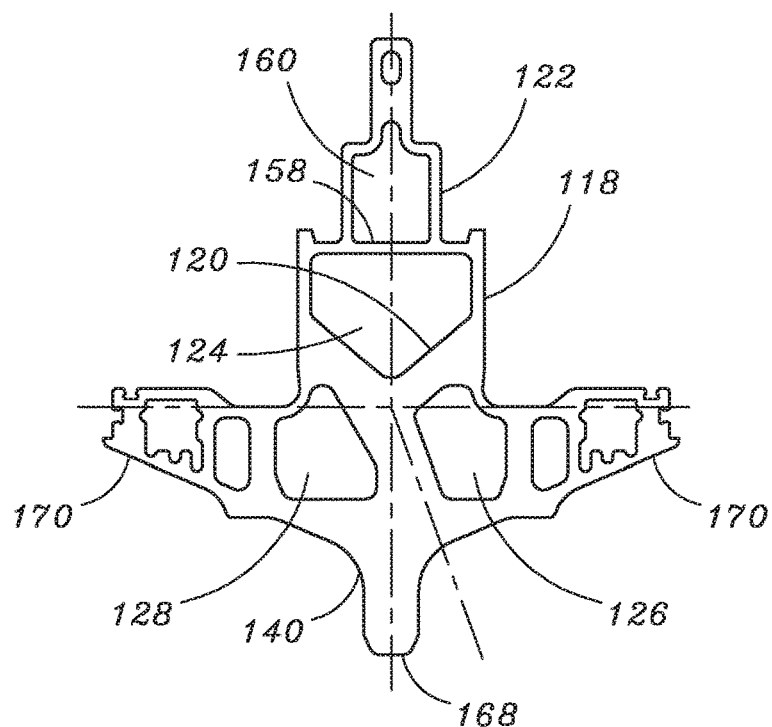
FIG. 11 is an end view illustrating an extrusion for a food article foreign material/product/defect removal apparatus, such as the removal apparatus illustrated in FIG. 1, where the extrusion includes straight nozzles in accordance with an example embodiment of the present disclosure.
Figure 12:
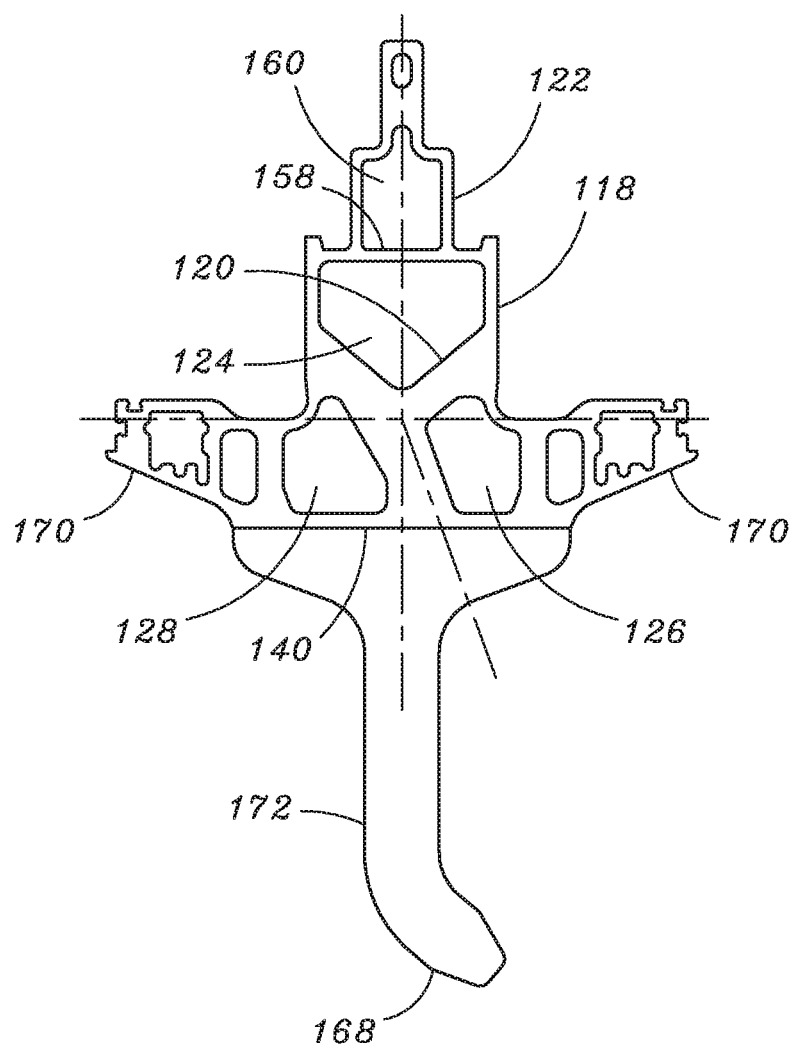
FIG. 12 is an end view illustrating an extrusion for a food article foreign material/product/defect removal apparatus, such as the removal apparatus illustrated in FIG. 1, where the extrusion includes a second, supplemental extrusion in accordance with an example embodiment of the present disclosure.

In some embodiments, the manifold 102 of the food article removal apparatus 100 includes an exterior wall 118 and an interior wall 120. For example, the manifold 102 is formed using a single extrusion 122 having a cross-sectional profile that includes the exterior wall 118 and the interior wall 120 (e.g., as shown in FIG. 9). The exterior wall 118 at least partially defines one or more chambers (e.g., a first chamber, a second chamber, etc.) for holding pressurized fluid (e.g., pressurized air). The interior wall 120 of the manifold 102 is disposed between two or more of the chambers. For instance, the exterior wall 118 at least partially defines a chamber 124, a chamber 126 (and possibly a chamber 128, another chamber, and so on), and the interior wall 120 is disposed between the chamber 124 and the chamber 126, the chamber 124 and the chamber 128, and/or the chamber 126 and the chamber 128. In some embodiments, two or more of the chamber 124, the chamber 126, the chamber 128, and possibly other chambers can be in fluid communication with one another (e.g., connected together so that substantially the entirety of the interior volume of the extrusion 122 can be used to hold pressurized fluid). In this manner, multiple valves 104 of the removal apparatus 100 can be actuated simultaneously, or at least substantially simultaneously, (e.g., individually and/or as a group) to remove defective food articles 106 from the food processing line 108. For example, one-fourth (¼) of the number of valves 104 of the removal apparatus 100, one-half (½) of the number of valves 104 of the removal apparatus 100, three-fourths (¾) of the number of valves 104 of the removal apparatus 100, all of the valves 104 of the removal apparatus 100, or another number of the valves 104 of the removal apparatus 100 can be actuated simultaneously, or at least substantially simultaneously.

The exterior wall 118 defines channels 130 that extend from a side 132 of the manifold 102 into fluid communication with one or more of the chamber 124, the chamber 126, and so forth. The exterior wall 118 can also define channels 134 that extend from, for example, a side 136 of the manifold 102 (e.g., opposite the side 132 of the manifold 102) into fluid communication with one or more of the chamber 124, the chamber 128, and so on. The interior wall 120 defines channels 138 that extend from the side 132 of the manifold 102 to a side 140 of the manifold 102. In some embodiments, the interior wall 120 can also define channels 142 that extend from the side 136 of the manifold 102 to the side 140 of the manifold 102. As described herein, the arrangement of the chambers within the manifold 102 and the configuration of the exterior wall 118 and the interior wall 120 can allow for a minimal number of transitions for routing the channels 138 and/or the channels 142 through the interior wall 120. For example, bores 144 drilled into the interior wall 120 from the side 132 and/or the side 136 of the manifold 102 can connect to bores 146 drilled into the interior wall 120 from the side 140 of the manifold 102 to form the channels 138 and/or the channels 142. In some embodiments, one or more of the channels can be of substantially the same size (e.g., width, cross-sectional area)

throughout the channel. In other embodiments, a channel may vary in size (e.g., width, cross-sectional area) from one section of the channel to another. For example, a bore 144 may have a different diameter (e.g., larger, smaller) than a bore 146.

In some embodiments, the channels 138 and/or the channels 142 that extend to the side 140 of the manifold 102 can be oriented to exit the manifold 102 in one or more directions. For example, the channels 138 and/or 142 shown in FIG. 6 can be angled (e.g., slanted) with respect to the side 140. However, in other embodiments, the channels 138 and/or 142 can be oriented differently with respect to the side 140. For instance, with reference to FIG. 10, some of the channels 138 and/or 142 can be angled, while others can be oriented perpendicularly (e.g., vertically) with respect to the side 140. In further embodiments, all of the channels 138 and/or 142 can be vertical (e.g., with reference to FIG. 11). In some embodiments, the channels 138 and/or 142 can exit the manifold 102 at nozzles 168, which can be formed as part of the extrusion 122 and then further machined, e.g., with bores 146. Further, it should be noted that the extrusion 122 can be formed with wings 170 that are lifted upwardly from the level of the nozzles 168. This arrangement can facilitate pathways for laser detection beams and so forth.

Figure 13:
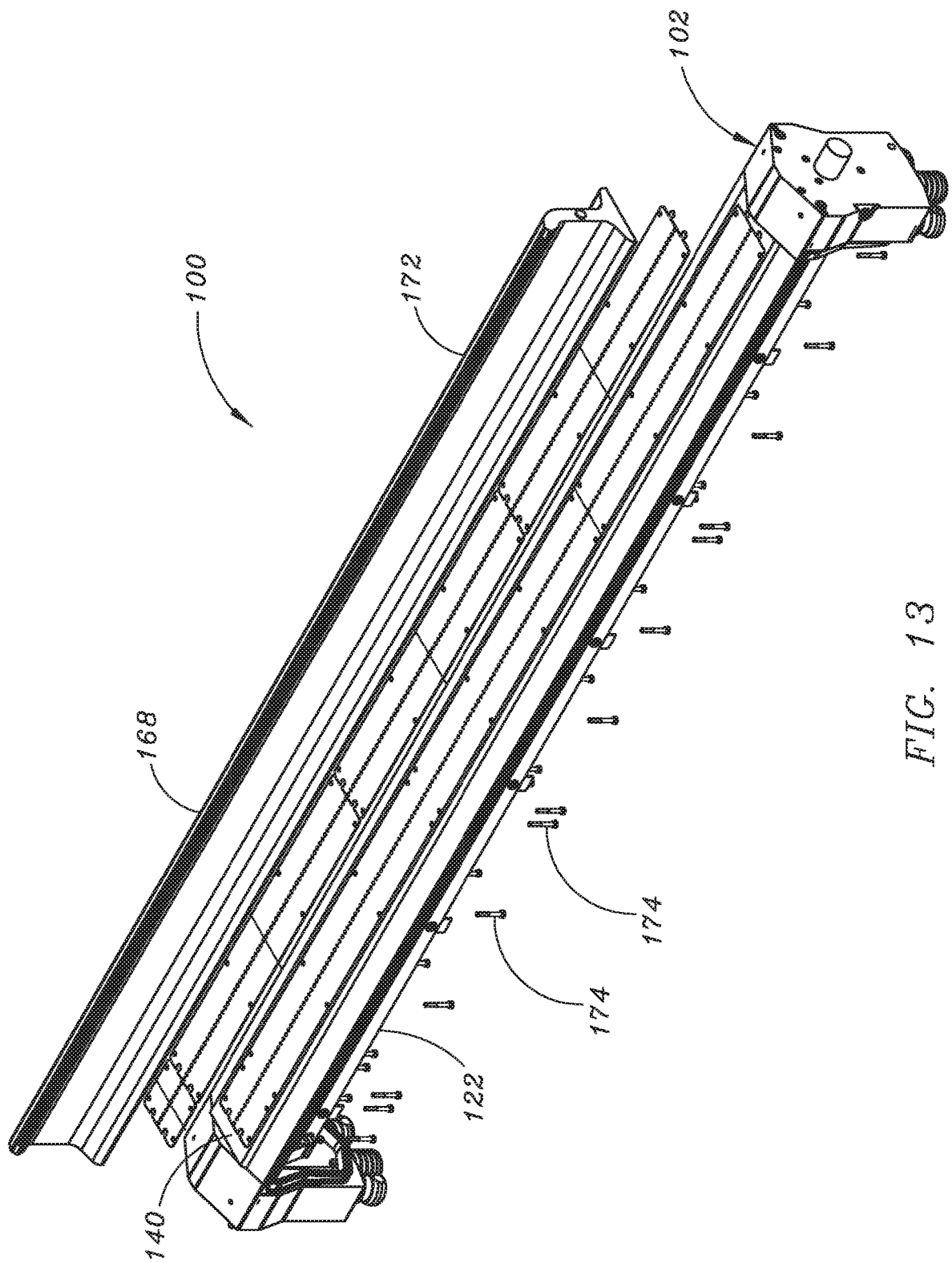
FIG. 13 is an exploded isometric view of the extrusion and the supplemental extrusion illustrated in FIG. 12.

In some embodiments, one or more additional components can be attached to an extrusion 122 (e.g., to form the nozzles 168). For example, a supplemental extrusion, such as a plate 172, can be bolted to the extrusion 122 (e.g., with reference to FIGS. 12 and 13). The plate 172 can include channels formed through the plate 172 such that the channels exit at ends of the nozzles 168. In some embodiments, these channels can be formed by bores machined from one side of the plate 172 to an opposing side of the plate 172 and/or from one side of the plate 172 and from an opposing side of the plate 172. The bores into the plate 172 can be aligned with, for example, the bores 146 so that the channels 138 and/or 142 continue through the nozzles 168. The plate 172 can be removed and replaced (e.g., with a plate having differently oriented nozzles, for cleaning purposes, and so on). Further, a plate 172 can be configured to attach to an extrusion 122 so that there are no exterior fasteners in and/or above the product zone. As shown in FIG. 13, fasteners (e.g., bolts 174) can be inserted through the extrusion 122 from a side opposite the side 140 and then connected to the plate 172. However, the bolts 174 are provided by way of example and not meant to limit the present disclosure. Thus, in other embodiments different fasteners can be used to secure the plate 172 (or other supplemental extrusions and/or additional components) to the extrusion 122, including, but not necessarily limited to: screws, nuts, rivets, pins, cams, and so forth.

In embodiments of the disclosure, the valves 104 of the food article removal apparatus 100 are used to selectively connect each one of the channels 130 and/or channels 134 to a corresponding one of the channels 138 and/or channels 142. In this manner, the pressurized fluid can be selectively dispensed from the chambers within the manifold 102 (e.g., from the side 140 of the manifold 102 or another side of the manifold 102). In some embodiments, multiple valves 104 are included in a valve assembly 148, which is coupled with the food article removal apparatus 100. In this configuration, sections of valves 104 (e.g., ten (10) valves, thirty-two (32) valves, forty-two (42) valves, or a different number of valves) can be operatively coupled with the removal apparatus 100 as a group (e.g., as opposed to individually wiring each valve to a power source, a controller, and so forth). Thus, when a valve 104 or valves 104 fails, the valve 104 or valves 104 of the valve assembly 148 can be removed and quickly replaced. In other embodiments, the corresponding valve assembly 148 can be removed, the failed valve 104 or valves 104 can be quickly replaced with another valve 104 or valves 104, and the valve assembly 148 can be returned to the removal apparatus 100. In some embodiments, airflow through a valve 104 can be reversed with respect to its ordinary pathway (e.g., as indicated by the manufacturer) so that airflow proceeds from what would otherwise be an outlet of the valve to what would otherwise be an inlet of the valve (e.g., as indicated in FIG. 17 by directional arrow 176).

In embodiments of the disclosure, one or more valve assemblies 148 can include a driver 150 (e.g., comprising a printed circuit board (PCB) 152) operably coupled with the valves 104, while the valves 104 can be pluggably coupled with the driver 150. For example, thirty-two (32) valves 104 can be coupled with a driver board. In some embodiments, the printed circuit board 152 includes stiffeners, thermal material, and so forth. The driver 150 can include pluggable valve connections 154 for the valves 104 so that the valves 104 can be plugged into the driver 150 (e.g., rather than individually wired to the printed circuit board 152). This configuration can prevent or minimize the potential for cross-wiring when connecting the valves 104 to the driver 150. Further, one or more alignment pins can be included with a valve assembly 148 to facilitate alignment of a valve 104 with a driver 150, alignment of a driver 150 with the manifold 102, and so on. The driver 150 can include connections for supplying power to the valves 104, providing commands to the valves 104, and so forth. For example, electrical power is supplied to each valve assembly 148 by one or more bus bars extending longitudinally along a header of the removal apparatus 100. In this manner, the driver 150 is operable to selectively actuate individual valves 104 (e.g., to remove defective food articles 106 from the food processing line 108). For example, the driver 150 includes one or more driver connections 156 for connecting the driver 150 to a source of electrical power, a communications network (e.g., a computer bus interface), and so forth. For example, the driver 150 includes one or more of an Ethernet connection port, a ribbon cable connection port, and so forth.

In some embodiments, the exterior wall 118 of the manifold 102 at least partially defines one or more additional chambers for holding fluid (e.g., air). Further, an interior wall 158 of the manifold 102 can be disposed between two or more of the chambers. For instance, the exterior wall 118 at least partially defines a chamber 160. In this configuration, the interior wall 158 is disposed between the chamber 160 and the chamber 124. In some embodiments, one or more of the chamber 124, the chamber 126, the chamber 128, and possibly other chambers can be in fluid communication with the chamber 160. The chamber 160 can be used to supply fluid (e.g., air) to the valve assemblies 148 for cooling. For example, each valve assembly 148 can include one or more cooling ports in fluid communication with the chamber 160. In some embodiments, a cooling port or set of cooling ports is provided for each printed circuit board 152.

The removal apparatus 100 can include a cover 162 that protects various components of the removal apparatus 100 within its operating environment, such as the valves 104. For example, the cover 162 can be used to prevent water from entering the manifold 102 (e.g., when the removal apparatus 100 is deployed with the food processing line 108). This configuration can allow exterior surfaces of the removal apparatus 100 to be cleaned in place. In some embodiments, one or more of the valve assemblies 148 includes handles 164 that can act as a guide for the cover 162. For example, the handles 164 can be configured to mate with corresponding grooves or slots defined by an interior of the cover 162. As described herein, the cover 162 does not necessarily include top entries, which could otherwise allow water to enter through the cover 162. Further, the removal apparatus 100 can include one or more sealing members 166 configured to seal the cover 162. In some embodiments, the removal apparatus 100 includes a quad ring sealing member. For instance, one or more 'T'-slot grooves are included, where multiple (e.g., two) 'O'-ring sealing members are disposed in a 'T'-slot groove.

In some embodiments, the cover 162 can be coupled with the manifold 102 using one or more latch mechanisms 178 so that the cover can be selectively engaged to secure to the manifold 102. Further, the cover 162 can be secured to the manifold 102 so that the latch mechanism 178 is covered by the cover 162. For example, the manifold 102 extends longitudinally in a first (e.g., horizontal) direction, and, when the cover 162 is secured to the manifold 102, the latch mechanism 178 is covered by the cover 162 with respect to a second (e.g., vertical) direction oriented generally perpendicular to the first direction. In some embodiments, a latch mechanism 178 can be disposed in a chamber 180 formed in the extrusion 122. For example, one or more interior walls 182 are used to separate the chambers 126 and/or 128 from a chamber 180 (e.g., as described with reference to FIG. 17).

Figure 14:
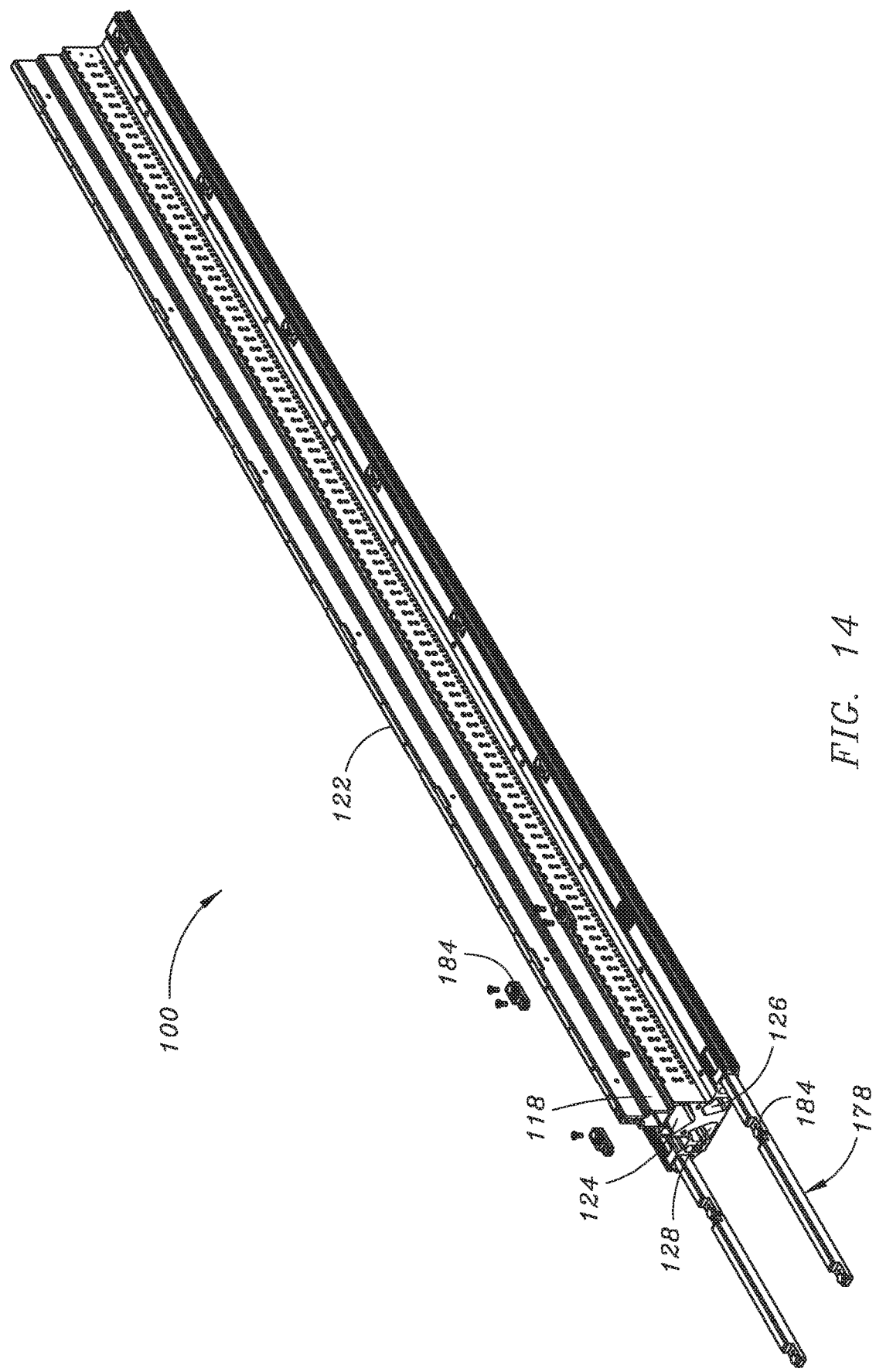
FIG. 14 is a partial exploded isometric view illustrating a food article foreign material/product/defect removal apparatus, where an extrusion is formed with chambers for housing latch mechanisms configured to engage a cover of the removal apparatus in accordance with an example embodiment of the present disclosure.
Figure 15:
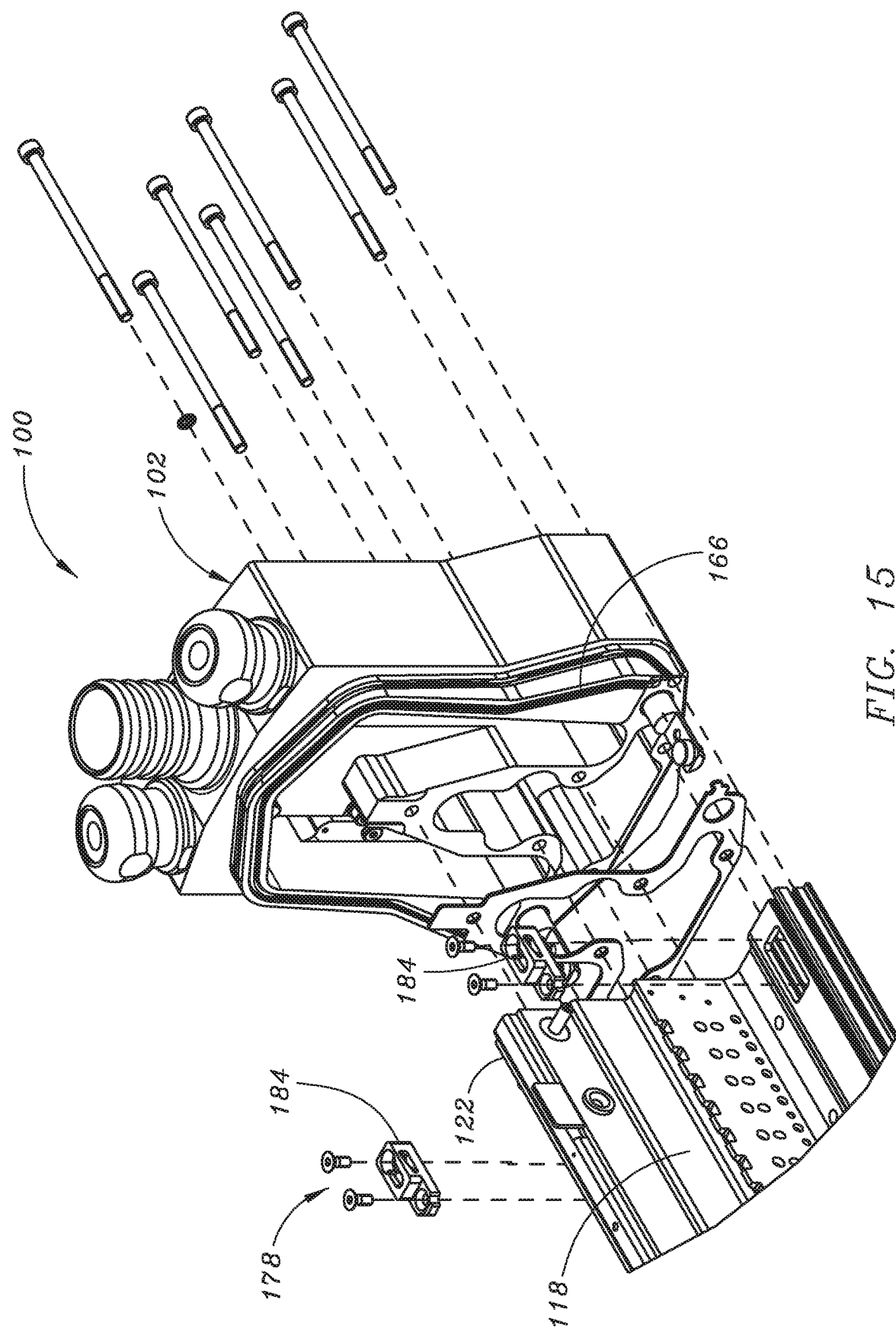
FIG. 15 is a partial exploded isometric view of the removal apparatus illustrated in FIG. 14.

An end wall of the extrusion 122 and/or the manifold 102 can define an access to a latch mechanism 178. For example, the latch mechanism 178 can extend through the end wall of the manifold 102, and can be moved from proximate to the end wall to secure and release the cover 162. In some embodiments, a latch 184 configured as a sliding mechanical wedge can be used to wedge a corresponding part of the cover 162 to secure the cover 162 to the manifold 102 (e.g., as shown in FIGS. 14 through 16). However, in other embodiments, a latch 184 can be configured differently. For example, a latch mechanism 178 can be configured as a cam shaft extending through a chamber 180 and including one or more latches 184 configured as cams, with pins extending from the cover 162 that can be engaged by the latches 184. In this configuration, the latches 184 can be rotated (e.g., ninety degrees (90°), one hundred and twenty degrees (120°), etc.) to release the pins of the cover 162 from engagement by the latches 184. Then, the cover 162 can be lifted from the manifold 102. In this manner, the cover 162 can be fastened to the manifold 102 without exterior fasteners in and/or above the product zone.

In another example, a latch mechanism 178 can be configured as a slide extending through a chamber 180 and including one or more latches 184 configured as magnets (e.g., permanent magnets, such as rare earth magnets, magnetized material, electromagnets, etc.), with material attracted to the magnets disposed on the cover 162 that can be engaged by the latches 184. In this example, a latch mechanism 178 can slide through a chamber 180 to one position where the latches 184 are aligned with the material attracted to the magnets to secure the cover 162 to the manifold 102, and also slide to another position out of alignment with the magnetically attracted material to disengage the latches 184 from the cover 162. However, it should be noted that these configurations are provided by way of example and are not meant to limit the present disclosure. Thus, in other embodiments, latch mechanisms 178, latches 184, cover 162, and/or manifold 102 can be configured differently. For example, the cover 162 can include magnets (e.g., permanent magnets, magnetized material, electromagnets, etc.), with the latch mechanisms 178 including material attracted to the magnets.

In some embodiments, valves 104 of the removal apparatus 100 each include a coil 186 that produces a magnetic field when electrical current is passed through the coil 186 to operate the valve 104. For example, one or more of the valves 104 can be configured as a solenoid valve, and electrical current can be supplied to the coil 186 of the valve 104 from a current source 188, such as AC mains. A current sensor 192 is configured to connect to the electrical circuit including the coil 186 and the current source 188. In embodiments of the disclosure, an optical indicator 190 (e.g., a light emitting diode (LED) configured as a send diode) or another optical indicator) can be configured to transmit characteristic information about the valve 104, including, but not necessarily limited to: a number of actuation cycles for the valve 104 (e.g., transmitted as thirty-two (32) bits of data), a unique identification (ID) for the valve 104 (e.g., transmitted as seventy-two (72) bits of data), a firmware version for the valve 104 (e.g., transmitted as eight (8) bits of data), a checksum (e.g., transmitted as eight (8) bits of data), and so on. In some embodiments, the characteristic information about the valve 104 can be transmitted in less than about one millisecond (1 ms). As described with reference to FIGS. 18 and 19, a valve assembly 148 can also include one or more optical sensors 194 (e.g., an LED configured as a receive diode), each configured to receive an optical indication from a corresponding optical indicator 190 of each valve 104 of the valve assembly 148. In this manner, optic links optically couple each optical indicator 190 of each valve 104 to a corresponding optical sensor 194.

In some embodiments, a controller 202 for controlling the removal apparatus 100 is communicatively coupled with the optical sensors 194 and the current sensor 192. The controller 202 can be configured to receive measurements from the current sensor 192 and determine multiple rates of change of electrical current supplied to a coil 186 (e.g., by differentiating the current measured by the current sensor 192). The controller 202 can then use the rates of change to determine a health of the corresponding valve 104, and possibly report the health of the valve 104 (e.g., to an operator via a user interface). In embodiments of the disclosure, use of the optical indicator 190 and the optical sensor 194 to establish the optic link can provide a cleaner signal for detection and analysis of how a valve 104 responds to being energized to open and/or close. Further, the data can be transmitted in real-time and in parallel with signals transmitted to the valve 104.

With reference to FIG. 19, the controller 202 can be configured to determine a valve 104 is healthy using a back electromotive force (back EMF) determined for the valve 104 based upon differentiating valve current measurements from the current sensor 192. For example, the valve is turned on with a control signal at time zero milliseconds (0 ms), and the back EMF is detected (e.g., a slope of the differentiated current measurements goes negative) between time one millisecond (1 ms) and time two milliseconds (2 ms). In this example, a current of one Ampere (1 A) is used to open the valve 104. However, the current is initially allowed to rise above this one Ampere (1 A) limit until the back EMF is detected, and then modulation begins at one Ampere (1 A) and can be subsequently adjusted to one-half Ampere (0.5 A). In some embodiments, a limit above one Ampere (1 A) (e.g., a maximum threshold) can be specified so that the current may not rise excessively before a back EMF is detected. Further, real-time detection of back EMF can be used to prevent or minimize over-driving a coil 186 on a valve 104. The valve is then open after time two milliseconds (2 ms).

By detecting the negative value for the back EMF, a determination of a healthy valve 104 can be made. However, if the back EMF does not go negative, a determination can be made that the valve 104 is not healthy. Further, in some embodiments, the controller 202 can be configured to determine a response time for the corresponding valve based on a back EMF and report the response time of the corresponding valve 104. Continuing the present example, the response time can be measured from time zero milliseconds (0 ms) to a time between time one millisecond (1 ms) and time two milliseconds (2 ms). In embodiments of the disclosure, characteristic information about a valve 104 can be collected in an offline mode, e.g., by adjusting flow rate, pressure, and so forth, and then actuating a valve 104 and collecting (and possibly filtering) EMF information to establish a baseline for the valve 104. Further in some embodiments, back EMF, response time, and so forth can be used to determine the degree to which a valve 104 is open.

In some embodiments, the health of a valve 104 can be determined by comparing optical indications (e.g., one or more health characteristics) received from a corresponding optical indicator 190 of each valve 104 of the valve assembly 148 to the differentiated valve current measurements for the valve 104. For example, a back EMF for a particular valve 104 can be compared with health characteristic information from the valve 104 (e.g., actuation cycles for the valve 104, a unique identification for the valve 104, a firmware version for the valve 104, etc.) to determine a health of the valve 104. For instance, when a back EMF is determined for a valve 104 as expected, but an unexpected valve identification and/or firmware version is indicated by a corresponding optical indicator 190 of the valve 104, a determination can be made that the valve 104 is unhealthy. In another example, when a back EMF is determined for a valve 104 as expected, but an actuation cycle count is received from a corresponding optical indicator 190 of the valve 104 showing a number of actuation cycles for the valve 104 that has not increased by one (1) as expected, a determination can be made that the valve 104 is unhealthy. In some embodiments, transmission of optical data including characteristic information about the valve 104 is not initiated until after modulation of electrical current to the valve 104 (e.g., so that back EMF detection is not corrupted).

In embodiments of the disclosure, valve health information can be generated to indicate the status of a valve 104 to an operator. Such information can include, for example, time-stamped information about a valve 104, such as current measurements from the current sensor 192, differentiated current measurements, valve response time, one or more optical indications from an optical indicator 190, and so forth. In some embodiments, the valve health information can be stored (e.g., logged) in an electronic database (e.g., a central system database). Additionally, when a determination of an unhealthy valve is made (e.g., a faulty valve, a valve nearing its end of life, etc.), one or more alerts can be provided to an operator. An alert can be initiated at an indicator, an alarm, an indicator and an alarm, and so forth. In some embodiments, an indicator can include an electronic display (e.g., a central display panel), one or more indicator lights, and so on. Further, an alarm can include an audible alarm, a visual alarm (e.g., an indicator light), a tactile alarm, a signal transmitted to a remote monitoring authority, and so forth. However, these alerts are provided by way of example only and are not meant to limit the present disclosure. In other embodiments, different and/or additional alerts can be initiated. For example, an alert is initiated in the form of an electronic message, such as an email message, a text message, and so on.

In some embodiments, an alert can be initiated using a light emitting device (e.g., a light emitting diode) on a driver 150, where the location of the light emitting device on the driver 150 corresponds to the location of a particular valve 104. In other embodiments, an alert can be initiated using a light emitting device (e.g., a light emitting diode) at the valve 104 (e.g., on a printed circuit board included with the valve). Further, an alert can be provided in the form of a numerical, textual, and/or graphical identification of an unhealthy valve, which may correspond to a marked location on, for example, the extrusion 122 (e.g., a numbered location stamped into the extrusion). The location of an unhealthy valve 104 can also be graphically depicted on a display, such as on a central display panel, and/or on another electronic device, including, but not necessarily limited to: a large touch panel product, an all-in-one computer, a mobile computing device (e.g., a hand-held portable computer, a Personal Digital Assistant (PDA), a laptop computer, a tablet computer, and so forth), a mobile telephone device (e.g., a cellular telephone or a smartphone), a device that includes functionalities associated with smartphones and tablet computers (e.g., a phablet), a surface computing device (e.g., a table top computer), a Personal Computer (PC) device, and so on. Further, in some embodiments, multiple removal apparatus 100 can be coupled with a single display (e.g., a central display panel). In this example, multiple drivers 150 and/or valves 104 can be graphically depicted, and an operator can manipulate the display (e.g., zoom in, zoom out) to display detailed information about particular drivers 150 and/or valves 104 and so forth.

Referring now to FIG. 20, a system 200 includes a food article removal apparatus 100 and a controller 202 for controlling the removal of defective food articles 106 from the food processing line 108. In some embodiments, the controller 202 is separate (e.g., remote) from the removal apparatus 100. In other embodiments, the controller 202 is housed with (e.g., within) the removal apparatus 100. For example, each driver 150 can include an associated controller 202. However, in other embodiments, each driver 150 does not necessarily include a controller 202. For example, one controller 202 can be connected to multiple drivers 150, and one or more of the drivers 150 may then not necessarily include a processor. The system 200, including some or all of its components, can operate under computer control. For example, a processor can be included with or in a system 200 to control the components and functions of systems 200 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 200. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The controller 202 can include a processor 204, a memory 206, and a communications interface 208. The processor 204 provides processing functionality for the controller 202 and can include any number of processors, micro-controllers, or other processing systems, and resident or external memory for storing data and other information accessed or generated by the controller 202. The processor 204 can execute one or more software programs that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 is an example of tangible, computer-readable storage medium that provides storage functionality to store various data associated with operation of the controller 202, such as software programs and/or code segments, or other data to instruct the processor 204, and possibly other components of the controller 202, to perform the functionality described herein. Thus, the memory 206 can store data, such as a program of instructions for operating the system 200 (including its components), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both.

The memory 206 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the removal apparatus 100 and/or the memory 206 can include removable integrated circuit card (ICC) memory, such as memory provided by a subscriber identity module (SIM) card, a universal subscriber identity module (USIM) card, a universal integrated circuit card (UICC), and so on.

The communications interface 208 is operatively configured to communicate with components of the system 200. For example, the communications interface 208 can be configured to transmit data for storage in the system 200, retrieve data from storage in the system 200, and so forth. The communications interface 208 is also communicatively coupled with the processor 204 to facilitate data transfer between components of the system 200 and the processor 204 (e.g., for communicating inputs to the processor 204 received from a device communicatively coupled with the controller 202). It should be noted that while the communications interface 208 is described as a component of a controller 202, one or more components of the communications interface 208 can be implemented as external components communicatively coupled to the system 200 via a wired and/or wireless connection. The system 200 can also comprise and/or connect to one or more input/output (I/O) devices (e.g., via the communications interface 208), including, but not necessarily limited to: a display, a mouse, a touchpad, a keyboard, and so on.

The communications interface 208 and/or the processor 204 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 208 can be configured to communicate with a single network or multiple networks across different access points.

In embodiments of the disclosure, the controller 202 can be used to monitor health and/or life cycle characteristics of the valves 104. For example, feedback from a valve 104 can be collected and used to determine a number of actuation cycles for a particular valve 104. Further, additional information can be collected about a valve 104, e.g., in embodiments where valve circuitry may be powered only when the valve 104 is actuated. This information can be used to predict when a valve 104 is at or nearing the end of its useful life within the system 200. However, actuation cycle counts are provided by way of example only and are not meant to limit the present disclosure. In other embodiments, a feedback loop can be used to determine how many cycles a valve 104 has been in an incorrect orientation (e.g., open when instructed to be shut, shut when instructed to be open). Further, in some embodiments, the system 200 tracks a length of time (e.g., in milliseconds) taken by a particular valve 104 to open and/or close. Additionally, the system 200 can also include one or more sensors configured to determine (e.g., sense, measure) an operating characteristic of a valve 104. For example, a back EMF associated with a solenoid is measured for a valve 104 (e.g., as previously described).

Information from a valve 104 can be collected when the valve 104 is initially deployed, and subsequent readings can be used to determine when the valve 104 begins acting erratically and/or slowly, which may be indicative of the end of its useful operating life. In this manner, the system 200 can monitor the health of individual valves 104, valve assemblies 148, and so forth, and can recommend intervention (e.g., replacement of an individual valve 104 or valves 104, maintenance on a valve assembly 148, replacement of a valve assembly 148, and so on). Further, the system 200 can initiate validation queries at predetermined and/or random time intervals. In some embodiments, one or more valves 104 of a valve assembly 148 can be configured as "send only" valves, where information is communicated to the controller 202 periodically (e.g., at periodic time intervals, at random time intervals, at pseudo-random time intervals, etc.) and/or at predetermined times (e.g., at scheduled times). However, in other embodiments, the controller 202 can initiate a request to receive information from a valve 104, e.g., where one or more valves 104 are configured as "send and receive" valves. In some embodiments, each valve position within the removal apparatus 100 can be labeled (e.g., numbered), and information presented to an operator regarding one or more valves can include an identification of the valve associated with its label.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A food article defect removal system for removing defective food articles from a food processing line, the food article defect removal system comprising:
    a manifold comprising an exterior wall at least partially defining a first chamber and a second chamber configured for holding pressurized fluid, the exterior wall defining a first plurality of channels extending from a first side of the manifold into fluid communication with at least one of the first chamber or the second chamber, the manifold comprising an interior wall disposed between the first chamber and the second chamber, the interior wall defining a second plurality of channels extending from the first side of the manifold to a second side of the manifold;
    a valve assembly comprising a plurality of valves selectively connecting each one of the first plurality of channels to a corresponding one of the second plurality of channels for selectively dispensing the pressurized fluid from the second side of the manifold, wherein at least one valve of the plurality of valves includes:
        a coil configured to produce a magnetic field when electrical current is passed through the coil to operate the at least one valve;
        an optical indicator configured to transmit, as optical data bits, an optical indication corresponding to at least one health characteristic of the at least one valve, the optical data bits transmitted as the optical indication comprising at least one of eight data bits, thirty-two data bits, or seventy-two data bits;
        an optical sensor configured to receive the optical indication comprising the optical data bits from the optical indicator; and
        a current sensor configured to connect to an electrical circuit including the coil and a current source for supplying electrical current to the coil; and
    a controller communicatively coupled with the valve assembly, the optical sensor, and the current sensor, the controller configured to determine a plurality of rates of change of electrical current supplied to the coil, compare the optical indication and the plurality of rates of change to determine a health of the at least one valve, and report the health of the at least one valve.

2. The food article defect removal system as recited in claim 1, wherein the first side of the manifold is different from the second side of the manifold.

3. The food article defect removal system as recited in claim 1, wherein the manifold comprises an extrusion that includes the exterior wall and the interior wall.

4. The food article defect removal system as recited in claim 1, wherein at least one of the second plurality of channels comprises a first bore extending from the first side of the manifold into fluid communication with a second bore extending from the second side of the manifold.

5. The food article defect removal system as recited in claim 1, wherein the first chamber defines a first volume, the second chamber defines a second volume, and the first chamber and the second chamber are connected to join the first volume and the second volume together in fluid communication to hold the pressurized fluid.

6. The food article defect removal system as recited in claim 1, wherein the at least one valve comprises a solenoid valve.

7. The food article defect removal system as recited in claim 1, wherein the optical indicator comprises a light emitting diode.

8. The food article defect removal system as recited in claim 1, wherein the controller is configured to determine the at least one valve is unhealthy when a back electromotive force determined for the at least one valve based upon the plurality of rates of change does not correspond to an optical indication from the optical indicator that electrical current is passing through the coil.

9. The food article defect removal system as recited in claim 1, wherein the controller is configured to determine the at least one valve is unhealthy when an optical indication from the optical indicator that electrical current is passing through the coil does not correspond to a back electromotive force determined for the at least one valve.

10. The food article defect removal system as recited in claim 1, wherein the controller is configured to determine a response time for the at least one valve based upon at least one of the optical indication or the plurality of rates of change and to report the response time of the at least one valve.

11. The food article defect removal system as recited in claim 1, further comprising a driver operably coupled with the plurality of valves for selectively actuating individual ones of the plurality of valves, the plurality of valves pluggably coupled with the driver.

12. The food article defect removal system as recited in claim 11, wherein the driver comprises a printed circuit board.

13. A food article defect removal system for removing defective food articles from a food processing line, the food article defect removal system comprising:
    a manifold comprising an extrusion including an exterior wall at least partially defining a first chamber and a second chamber configured for holding pressurized fluid, the exterior wall defining a first plurality of channels extending from a first side of the extrusion into fluid communication with at least one of the first chamber or the second chamber, the extrusion comprising an interior wall disposed between the first chamber and the second chamber, the interior wall defining a second plurality of channels extending from the first side of the extrusion to a second side of the extrusion;

a plurality of valves selectively connecting each one of the first plurality of channels to a corresponding one of the second plurality of channels for selectively dispensing the pressurized fluid from the second side of the extrusion, wherein at least one valve of the plurality of valves includes:

a coil configured to produce a magnetic field when electrical current is passed through the coil to operate the at least one valve;

an optical indicator configured to transmit, as optical data bits, an optical indication corresponding to at least one health characteristic of the at least one valve, the optical data bits transmitted as the optical indication comprising at least one of eight data bits, thirty-two data bits, or seventy-two data bits; and an optical sensor configured to receive the optical indication comprising the optical data bits from the optical indicator.

14. The food article defect removal system as recited in claim 13, wherein the at least one valve further comprises a current sensor configured to connect to an electrical circuit including the coil.

15. The food article defect removal system as recited in claim 14, further comprising:

a current source for supplying electrical current to the coil; and a controller communicatively coupled with the at least one valve, the optical sensor, and the current sensor, the controller configured to determine a plurality of rates of change of electrical current supplied to the coil, compare the optical indication and the plurality of rates of change to determine a health of the at least one valve, and report the health of the at least one valve.

16. The food article defect removal system as recited in claim 13, wherein the first side of the extrusion is different from the second side of the extrusion.

17. The food article defect removal system as recited in claim 13, wherein at least one of the second plurality of channels comprises a first bore extending from the first side of the extrusion into fluid communication with a second bore extending from the second side of the extrusion.

18. The food article defect removal system as recited in claim 13, wherein the first chamber defines a first volume, the second chamber defines a second volume, and the first chamber and the second chamber are connected to join the first volume and the second volume together in fluid communication to hold the pressurized fluid.

19. A food article defect removal system for removing defective food articles from a food processing line, the food article defect removal system comprising:

a manifold comprising an exterior wall at least partially defining a first chamber and a second chamber configured for holding pressurized fluid, the exterior wall defining a first plurality of channels extending from a first side of the manifold into fluid communication with at least one of the first chamber or the second chamber, the manifold comprising an interior wall disposed between the first chamber and the second chamber, the interior wall defining a second plurality of channels extending from the first side of the manifold to a second side of the manifold;

a plurality of valves selectively connecting each one of the first plurality of channels to a corresponding one of the second plurality of channels for selectively dispensing the pressurized fluid from the second side of the manifold, wherein at least one valve of the plurality of valves includes:

a coil configured to produce a magnetic field when electrical current is passed through the coil to operate the at least one valve;

an optical indicator configured to transmit, as optical data bits, an optical indication corresponding to at least one health characteristic of the at least one valve, the optical data bits transmitted as the optical indication comprising at least one of eight data bits, thirty-two data bits, or seventy-two data bits; and an optical sensor configured to receive the optical indication comprising the optical data bits from the optical indicator.

20. The food article defect removal system as recited in claim 19, further comprising:

a current sensor configured to connect to an electrical circuit including the coil;

a current source for supplying electrical current to the coil; and a controller communicatively coupled with the at least one valve, the optical sensor, and the current sensor, the controller configured to determine a plurality of rates of change of electrical current supplied to the coil, compare the optical indication and the plurality of rates of change to determine a health of the at least one valve, and report the health of the at least one valve.

* * * * *